United States Patent Office 3,299,053
Patented Jan. 17, 1967

3,299,053
NOVEL 1- AND/OR 4-SUBSTITUTED ALKYL 5-AROMATIC - 3H - 1,4 - BENZODIAZEPINES AND BENZODIAZEPINE-2-ONES
Giles A. Archer, Essex Fells, Rodney Ian Fryer, West Orange, Earl Reeder, Nutley, and Leo Henryk Sternbach, Upper Montclair, N.J., assignors to Hoffmann-La Roche Inc., Nutley, N.J., a corporation of New Jersey
No Drawing. Filed Feb. 11, 1964, Ser. No. 343,941
26 Claims. (Cl. 260—239.3)

This invention relates to novel 1- and/or 4-substituted amino alkyl 5-aromatic-3H-1,4-benzodiazepines, novel derivatives thereof, novel processes of making the same and novel intermediates useful in the said processes.

The novel 5-aromatic-3H-1,4-benzodiazepines and derivatives thereof to which the invention relates are selected from the group consisting of compounds of the formula

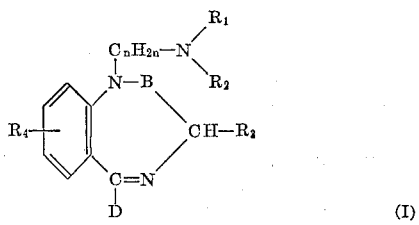

compounds of the formula

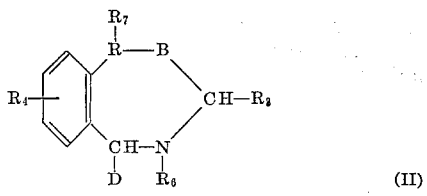

and pharmaceutically acceptable acid addition salts thereof wherein D is selected from the group consisting of

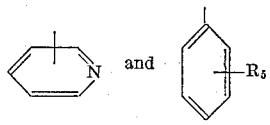

B is selected from the group consisting of carbonyl and methylene; $n$ is a whole integer from 2 to 7; $R_1$ and $R_2$ are selected from the group consisting, individually, of hydrogen and lower alkyl and, taken together with the nitrogen atom, a mono-heterocyclic ring structure including, at the most, one further hetero atom selected from the group consisting of nitrogen and oxygen and, at the most, one substituent on the heterocyclic ring nucleus, at least one of $R_1$ and $R_2$ being other than hydrogen; $R_3$ is selected from the group consisting of hydrogen, lower alkyl, hydroxy and lower alkanoyloxy; $R_4$ is selected from the group consisting of hydrogen, halogen, trifluoromethyl, lower alkyl-mercapto, nitro, cyano and lower alkyl; $R_5$ is selected from the group consisting of hydrogen, halogen, trifluoromethyl, lower alkyl and nitro; $R_6$ and $R_7$ are selected from the group consisting of hydrogen, lower alkyl, lower alkenyl, lower alkynyl and

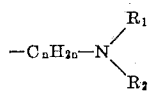

and at least one of $R_6$ and $R_7$ is

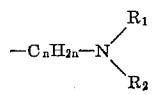

Compounds of Formula I above wherein B is a carbonyl group are 3H - 1,4 - benzodiazepin-2(1H)-ones. Compounds of Formula I above wherein B is a methylene group are 2,3-dihydro-1H-1,4-benzodiazepines. The corresponding compounds of Formula II can be referred to as the 4,5-dihydro derivatives thereof.

The symbols R have the following significance:

$R_1$ and $R_2$, when individual radicals, represent hydrogen or straight or branched chain lower alkyl groups such as methyl, ethyl, propyl, isopropyl, butyl or the like and, when taken together, are divalent groups, which, together with the nitrogen to which they are attached, form a 5- or 6-membered monoheterocyclic ring structure such as piperazinyl, piperidinyl, pyrrolidinyl, morpholinyl and substituted derivatives thereof. Among the substituents suitable for forming the substituted derivatives are included branched or straight chain lower alkyl groups such as methyl or ethyl, lower alkenyl oxy-lower alkyl groups such as vinyloxyethyl, hydroxy lower alkyl groups such as hydroxy ethyl and lower alkoxy lower alkyl groups such as ethoxyethyl. In one aspect, when the ring structure contains a further hetero nitrogen atom, the substituent is preferably attached thereto. In a preferred embodiment, $R_1$ and $R_2$ are both lower alkyl;

$R_3$ is either hydrogen, straight or branched chain lower alkyl such as methyl, ethyl, propyl, isopropyl or the like, hydroxy or lower alkanoyloxy such as acetoxy;

$R_4$ represents hydrogen, halogen, cyano, lower alkyl such as methyl and the like, trifluoromethyl, lower alkyl-mercapto such as methyl-mercapto and the like, or nitro. The term halogen includes all four halides;

$R_5$ is hydrogen, halogen, trifluoromethyl, nitro or lower alkyl such as methyl and the like;

$R_6$ and $R_7$ represent hydrogen or straight or branched chain lower alkyl, lower alkenyl or lower alkynyl such as methyl, ethyl, propyl, isopropyl, allyl, propargyl and the like, or a tertiary amino-lower alkyl grouping of the formula

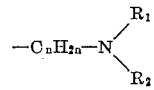

The symbolic grouping —$C_nH_{2n}$— represents straight or branched chain lower alkyl groups containing two or more carbon atoms between the nitrogen atoms joined thereby such as ethylene, propylene, isopropylene, butylene and the like.

In a preferred aspect, the said heterocyclic ring structure is saturated and, thus, $R_1$ and $R_2$, when taken together with the nitrogen atom and, at most, one further hetero atom, represent a member selected from the group consisting of N-lower alkylpiperazinyl, N-hydroxy-lower alkyl-piperazinyl, N-lower alkyloxy-lower alkyl-piperazinyl, N-lower alkenyloxy-lower alkyl-piperazinyl, pyrrolidinyl, piperazinyl, morpholinyl and piperidinyl.

In a more preferred aspect, $R_1$ and $R_2$, when taken together with the nitrogen and, at the most, one further hetero atom selected from the group consisting of oxygen and nitrogen, represent a moiety selected from the group consisting of N-lower alkyl-piperazinyl, N-hydroxy-lower alkylene-piperazinyl, N-lower alkyloxy-lower alkylene-piperazinyl, N-lower alkenyloxy-lower alkylene-piperazinyl, pyrrolidinyl, piperazinyl, morpholinyl and piperidinyl. Thus, $R_1$ and $R_2$, when taken together, can represent, for example, a lower alkylene chain such as a polymethylene chain of preferably four or five carbon atoms, lower alkylene-oxy-lower alkylene, N—$R_8$ lower alkylene-aza-lower alkylene, wherein $R_8$ is selected from the group consisting of lower alkyl, hydroxy-lower alkyl, lower alkoxy-lower alkyl, lower alkenyloxy-lower alkyl and the like.

Also included within the present invention are compounds of the formula

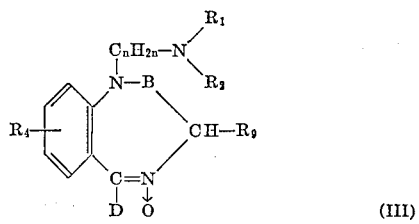

(III)

wherein $n$, $R_1$, $R_2$, $R_4$, B and D have the same meaning as above and $R_9$ is selected from the group consisting of hydrogen and lower alkyl.

Compounds of Formula III above are especially of interest as intermediates for the preparation of compounds of Formula I above. The latter compounds can be prepared from corresponding compounds of Formula III by hydrogenation in the presence of a suitable hydrogenation catalyst, such as Raney nickel, or by treatment with a reducing agent, for example a phosphorus trihalide such as phosphorus trichloride.

Compounds of Formula I above wherein $R_3$ is lower alkanoyloxy can be prepared from compounds of Formula III above by treating the last-mentioned compounds with an anhydride of a lower alkanoic acid, e.g. acetic anhydride. The resultant compounds, i.e. compounds of Formula I have wherein $R_3$ is lower alkanoyloxy can be converted into compounds wherein $R_3$ is hydroxy by treatment of such compounds with an alkali metal hydroxide, e.g. sodium hydroxide or an alkaline earth metal hydroxide or a mineral acid.

In addition to the compounds of Formulae I–III above, there are also encompassed within the invention the pharmaceutically acceptable salts of said compounds. The compounds of Formulae I–III form pharmaceutically acceptable acid addition salts with 1 or more moles (depending on the number of basic nitrogen atoms present) of pharmaceutically acceptable acid, for example, with inorganic and organic acids such as hydrochloric acid, hydrobromic acid, sulfuric acid, phosphoric acid, nitric acid, citric acid, tartaric acid, salicyclic acid, toluene-sulfonic acid, ascorbic acid, maleic acid, succinic acid, formic acid, acetic acid and the like.

In a comprehensive aspect, the invention relates to a method which comprises the reaction of a 1-sodio derivative of a compound of the formula

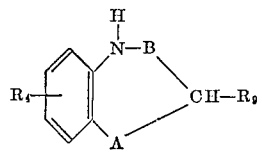

wherein A is a selected from the group consisting of

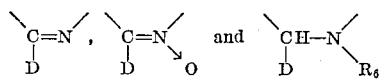

B is selected from the group consisting of carbonyl and methylene; D is selected from the group consisting of

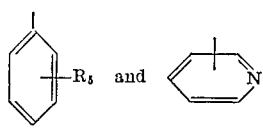

$R_9$ is selected from the group consisting of hydrogen and lower alkyl; $R_4$ is selected from the group consisting of hydrogen, halogen, trifluoromethyl, lower alkyl-mercapto, nitro, cyano and lower alkyl; $R_5$ is selected from the group consisting of hydrogen, halogen, trifluoromethyl, lower alkyl and nitro; $R_6$ is selected from the group consisting of hydrogen, lower alkyl, lower alkynyl, lower alkenyl and

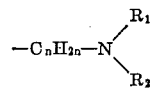

wherein $n$ is a whole integer from 2 to 7, $R_1$ and $R_2$ being selected from the group consisting of, individually, hydrogen and lower alkyl and, taken together with the nitrogen atom, a mono-heterocyclic ring structure including, at the most, one further hetero atom selected from the group consisting of nitrogen and oxygen and, at the most, one substituent on the heterocyclic ring nucleus, at least one of $R_1$ and $R_2$ being other than hydrogen with a compound of the formula $$X\text{---}C_nH_{2n}\text{---}Z$$

wherein Z is selected from the group consisting of halogen, e.g. chlorine, bromine and iodine and

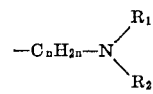

wherein $R_1$ and $R_2$ are as above and X is halogen, preferably a halogen selected from the group of chlorine, bromine and iodine.

Compounds of Formulae I and III above, in one aspect, can be prepared from corresponding 5-aromatic -3H-1,4-benzodiazepines wherein the 1-position nitrogen atom is unsubstituted, i.e. bears a hydrogen atom attached thereto, by reaction of these compounds, preferably after first effecting conversion of said unsubstituted compounds into their 1-sodio derivatives, with an amino-lower alkyl halide of the formula

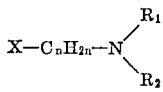

wherein $n$, $R_1$ and $R_2$ have the same meaning as above and X is a halogen atom selected from the group consisting of chlorine, bromine and iodine.

The above reaction can be conducted in an inert organic solvent medium utilizing one or more inert organic solvents such as methanol, ethanol, dimethylformamide, benzene, toluene, and N-methyl pyrrolidone or the like. Temperature and pressure are not critical and the reaction can be carried out at room temperature and atmospheric pressure, or at elevated temperatures and/or elevated pressures. Conventional reagents such as sodium methoxide, sodium hydride, or the like can be employed to form the sodio derivative. The 1-sodio derivatives and the 1-unsubstituted compounds from which they are formed are not a part of this invention but their preparation is set forth herein in order that the present disclosure may be complete.

In an alternate procedure for preparing compounds of the Formulae I and III above, the corresponding 5-aromatic-3H-1,4-benzodiazepines wherein the 1-position nitrogen atom is unsubstituted, i.e. bears a hydrogen atom attached thereto, is reacted with a compound having the formula $$X\text{---}C_nH_{2n}\text{---}X'$$

wherein $n$ represents a whole integer from 2 to 7 and X and X' are the same or different halogen atoms and thus, respectively, represent members selected from the group consisting of bromine, chlorine and iodine, preferably after first effecting conversion of the said unsubstituted compounds into their 1-sodio derivative. In a preferred embodiment, X is bromine and X' is chlorine.

The resulting compound which contains a $$\text{---}C_nH_{2n}\text{---}X'$$

group in the 1-position, wherein $n$ and $X'$ are as defined above, is then reacted with an amine having the formula

wherein $R_1$ and $R_2$ are as above to give compounds having the Formulae I and III above. The process set out above for forming compounds corresponding to Formulae I and III above is illustrated more particularly in the following diagrammatical flow sheet wherein the symbols, $n$, $R_1$, $R_2$, $R_9$, $R_4$, $X$, $X'$, B and D have the meaning ascribed thereto hereinabove and E is selected from the group consisting of

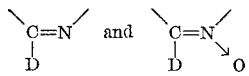

(A)
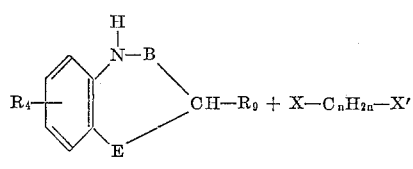

e.g. NaOCH$_3$ ↓

(IV)
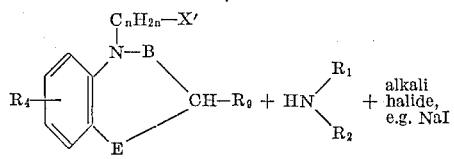

↓

(I)
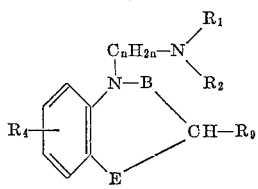

Compounds having the Formula IV above are novel and are useful as anticonvulsants as well as being useful as intermediates in the process under discussion.

The first stage of the above reaction, i.e. the formation of compound IV via the reaction of compounds of Formula A with compounds of the formula $$X-C_nH_{2n}-X'$$

can be conducted in an inert organic solvent utilizing one or more inert organic solvents such as methanol, ethanol, dimethylformamide, benzene, toluene, N-methyl pyrrolidone or the like. Temperatures and pressure are not critical and the reaction can be carried out at room temperature or at atmospheric pressure or at elevated temperatures and/or elevated pressures. Conventional reagents such as sodium methoxide, sodium hydride, or the like, can be employed to form the sodio derivative.

The second stage of the reaction, i.e. the formation of compounds of Formula I wherein $R_3$ is hydrogen or lower alkyl and compounds of Formula III from compounds of the Formula IV above can be conducted in an inert organic solvent medium utilizing one or more inert organic solvents such as acetone, methyl ethyl ketone, methanol, ethanol, dimethylformamide, benzene, nitromethane and N-methyl-pyrrolidone or the like. Here again, temperature and pressure are not critical and the reaction can be carried out at or below room temperature and at atmospheric pressure, or at elevated temperatures and/or elevated pressures. The second stage proceeds preferably in the presence of an alkali halide such as sodium iodide.

Any primary or secondary amine of the formula

can be suitably employed in the second stage wherein $R_1$ and $R_2$ have the same meaning as above. If a secondary amine is utilized, the two carbon atoms joined to the nitrogen atom of the amine can, respectively, form a part of a group which exists independently of the other group. Therefore, such carbon atoms can individually comprise a part of a straight or branched chain aliphatic radical such as methyl, ethyl, propyl, isopropyl or the like. Alternatively, such carbon atoms can comprise part of a divalent radical and such radicals can combine with each other directly or through the said, at the most, one further hetero atom, to form a group such as pentamethylene, tetramethylene, ethyleneoxyethylene and ethyleneazaethylene.

Representative of compounds corresponding to formula $X-C_nH_{2n}-X'$ suitable for utilization in the front stage of the hereinabove described process are 1 - bromo - 3 - chloropropane 2-bromoethyl chloride and 1 - bromo - 4 - chlorobutane.

Compounds of Formula II above can be formed from compounds of Formula I above by reduction. For example, the latter compounds can be reduced with hydrogen in the presence of a hydrogenation catalyst, such as platinum oxide, to yield corresponding compounds wherein $R_6$ is hydrogen, and in turn these compounds can be converted into corresponding compounds wherein $R_6$ is lower alkyl, lower alkenyl or lower alkynyl by reaction with a lower alkyl, lower alkenyl or lower alkynyl-halide. Similarly, compounds of Formula II wherein $R_6$ is hydrogen can be converted into corresponding compounds wherein $R_6$ is

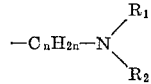

by reaction with an amino-lower alkyl halide of the formula

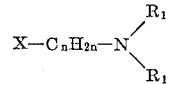

wherein $n$, $R_1$ and $R_2$ have the same meaning as above and X is a halogen selected from the group consisting of chlorine, bromine and iodine.

Compounds prepared in this manner wherein $R_7$ is hydrogen, can be converted into compounds wherein $R_7$ is lower alkyl, lower alkenyl or lower alkynyl by reaction of said compounds, preferably after effecting conversion of said compounds into their 1-sodio derivatives, with a lower alkyl, lower alkenyl or lower alkynyl-halide. Also, compounds of Formula II wherein $R_7$ is hydrogen can be converted into corresponding compounds wherein $R_7$ is

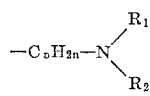

via the one-step method described above for the preparation of compounds of Formulae I and III from the corresponding 5-aromatic-3H - 1,4 - benzodiazepine wherein the 1-position nitrogen atom is unsubstituted, i.e., by reacting the last mentioned compounds with a compound of the formula

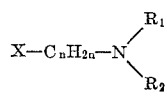

as above.

Furthermore, compounds of Formula II wherein $R_6$ or $R_7$ are hydrogen can be converted into corresponding compounds having a —$C_nH_{2n}$—X' grouping in the 1-position or in the 4-position or in the 1- and the 4-position wherein $n$ is a whole integer from 2 to 7 and X' is halogen via the method described above for the preparation of compounds of Formula IV. The resulting compounds which have a —$C_nH_{2n}$—X' grouping in the 1-position and/or the 4-position and which, thus, have the formula

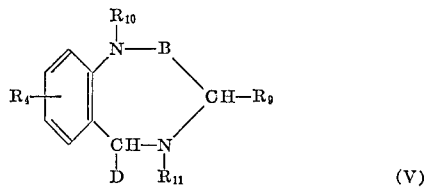

(V)

wherein $R_4$, $R_9$, B and D have the same meanings as ascribed hereto hereinabove and $R_{10}$ and $R_{11}$ are selected from the group consisting of hydrogen, lower alkyl, lower alkenyl, lower alkynyl and —$C_nH_{2n}$—X' and at least one of $R_{10}$ and $R_{11}$ is —$C_nH_{2n}$—X', are novel and thus constitute a part of the present invention.

Such compounds are useful as intermediates in the preparation of compounds of Formula II above.

Compounds of Formula V above can be converted into corresponding compounds of Formula II above by means of the reaction thereof with a primary or a secondary amine of the formula

in the presence of an inert solvent in the manner set out above.

Thus, in another aspect, the invention relates to a process which comprises the reaction of a 1-sodio derivative of a compound of the formula

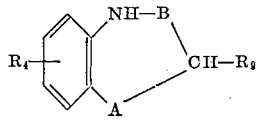

wherein A is selected from the group consisting of

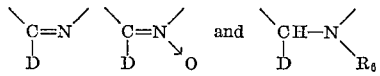

D is selected from the group consisting of

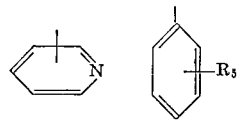

B is selected from the group consisting of methylene and carbonyl; $R_9$ is selected from the group consisting of hydrogen and lower alkyl; $R_4$ is selected from the group consisting of hydrogen, halogen, trifluoromethyl, lower alkyl mercapto, nitro, cyano and lower alkyl; $R_5$ is selected from the group consisting of hydrogen, halogen, trifluoromethyl, lower alkyl and nitro; and $R_6$ is selected from the group consisting of hydrogen, lower alkyl, lower alkenyl, lower alkynyl and

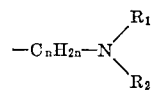

wherein $n$ represents a whole integer from 2–7 and $R_1$ and $R_2$ are selected from the group consisting of, individually, lower alkyl and, taken together with a nitrogen atom, a mono-heterocyclic ring structure including, at the most, one further hetero atom selected from the group consisting of nitrogen and oxygen and, at the most, one substituent on the heterocyclic ring nucleus, with a compound of the formula

wherein $n$ represents a whole integer from 2 to 7 and X and X' are the same or different halogen atoms.

In a further aspect of the general concept of the present invention, the invention relates to a method which comprises the reaction of a compound having the formula

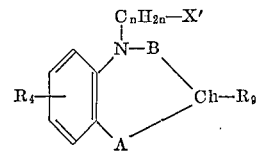

wherein A is selected from the group consisting of

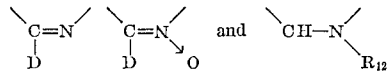

D is selected from the group consisting of

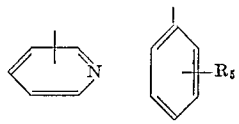

B is selected from the group consisting of carbonyl and methylene; $n$ is a whole integer from 2 to 7; X' represents halogen; $R_9$ is selected from the group consisting of hydrogen and lower alkyl; $R_4$ is selected from the group consisting of hydrogen, halogen, trifluoromethyl, lower alkyl mercapto, cyano, lower alkyl and nitro; $R_5$ is selected from the group consisting of hydrogen, halogen, trifluoromethyl, lower alkyl and nitro and $R_{12}$ is selected from the group consisting of hydrogen, lower alkyl, lower alkenyl, lower alkynyl

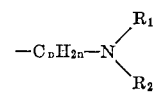

and $C_nH_{2n}$—X' with an amine of the formula

wherein $R_1$ and $R_2$ are as above.

Compounds of Formula I above wherein $R_4$ is nitro can be reduced by conventional techniques, i.e., hydrogenation in the presence of Raney nickel, to form the corresponding compound wherein $R_4$ is amino. The resultant compound, wherein $R_4$ is amino, if desired, can be converted into the corresponding compound wherein $R_4$ is halogen by treatment thereof with nitrous acid in the presence of a mineral acid, e.g., hydrochloric acid, followed by treatment of the resulting substance with a strong hydrohalic acid, e.g., hydrochloric acid in the presence of a copper catalyst, e.g., cuprous chloride.

Compounds of Formula III above, unsubstituted in the 1-position wherein B is methylene, i.e. 2,3-dihydro-5-phenyl-1H-1,4-benzodiazepine 4-oxides are prepared from the corresponding 2,3-dihydro-5-phenyl-1H-1,4-benzodiazepines via oxidation. In order to provide for facile oxidation of the 4-position nitrogen atom, it is suitable to first protect the 1-position nitrogen atom with an acyl protecting group, for example, a lower alkanoyl e.g. formyl or acetyl, radical. Having so protected the 1-position nitrogen atom, the so-obtained 1-lower alkanoyl-2,3-dihydro-5-phenyl-1H-1,4-benzodiazepine can then be oxidized via utilization of various oxidizing agents known per se, for example, hydrogen peroxide or peracids. As peracids there can be used any of the conveniently available known peracid oxidizing agents, for example, peracetic acid, trifluoro-peracetic acid, perbenzoic acid, perphthalic acid and persulfuric acid. The oxidation can be effected at room temperature or above or below room temperature. The preparation of such unsubstituted compounds does not constitute a part of the present invention.

As is evident from the above, one group of perferred compounds within the purview of the present invention is provided with a phenyl group in the 5-position. Such compounds have the formulae

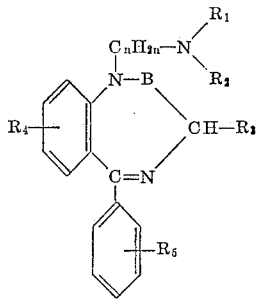

(a)

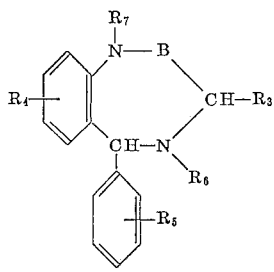

(b)

and

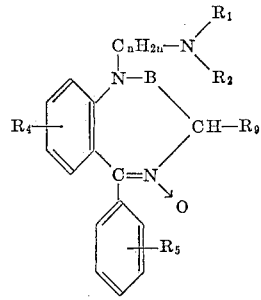

(c)

wherein $n$, $R_1$, $R_2$, $R_3$, $R_4$, $R_6$, $R_7$, $R_9$ and B have the the same meanings as ascribed thereto hereinabove.

As is also evident from the above, another group of preferred compound within the purview of the present invention have a pyridyl group in the 5-position. Such compounds have the formulae

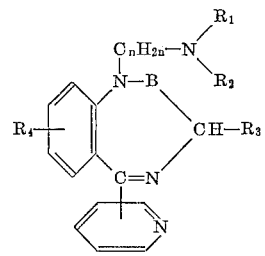

(d)

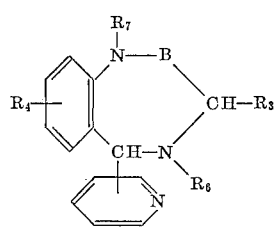

(e)

and

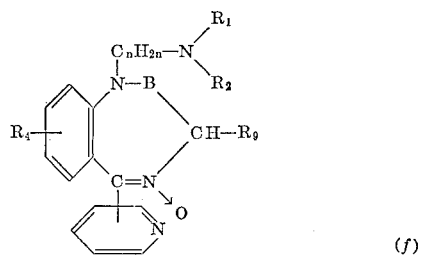

(f)

wherein $n$, $R_1$, $R_2$, $R_3$, $R_4$, $R_6$, $R_7$, $R_9$ and B have the same meanings as ascribed thereto hereinabove.

In a preferred aspect, compounds wherein D is

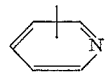

have the pyridyl group attached to the benzodiazepine nucleus at the α-position.

Compounds of Formulae I–III above (i.e. compounds a, b, c, d, e and f above) and their pharmaceutically acceptable acid addition salts are useful as anticonvulsants, analgesics, sedatives, muscle relaxants, hypotensive and antidepressants. They can be administered internally, for example, parenterally or enterally in conventional pharmaceutical dosage forms. For example, they can be incorporated in conventional liquid or solid vehicles to provide elixirs, suspensions, tablets, capsules, powders and the like according to acceptable pharmaceutical practice.

This application is a continuation-in-part of applications Serial Nos. 176,901, filed March 2, 1962 and 259,753, filed February 19, 1963 in the names of Giles A. Archer, Rodney Ian Fryer, Earl Reeder and Leo Henryk Sternbach. Both of the aforesaid applications are now abandoned.

The following examples are illustrative but not limitative of the invention. All temperatures are in degrees centigrade and all melting points are corrected.

*Example 1*

A solution of 11.5 g. of 7-chloro-5-phenyl-3H-1,4-benzodiazepin-2(1H)-one 4-oxide and 2.2 g. of sodium methoxide in 80 ml. of dimethylformamide was stirred at room temperature for 15 minutes. A solution of 0.045 mole of dimethylaminoethyl chloride in 80 ml. of benzene (This solution was prepared by treating the corresponding amount of dimethylaminoethyl chloride hydrochloride with an excess of cold 50% potassium hydroxide. Solid anhydrous sodium carbonate was then added to produce a slurry which was extracted with benzene. The benzene solution was dried with sodium carbonate and used in the reaction.) was added, the reaction mixture was heated on the steambath for one hour and then poured into ice cold dilute hydrochloric acid. The aqueous layer was made alkaline with dilute sodium hydroxide and extracted with methylene chloride. The organic layer was separated, dried and concentrated in vacuo. The residue was crystallized from a mixture of ether and petroleum ether yielding 1-(2-dimethylaminoethyl) - 7-chloro-5-phenyl-3H-1,4-benzodiazepin-2(1H)-one 4-oxide. After recrystallization from a mixture of acetone and petroleum ether the product formed colorless prisms melting at 146–7°.

*Example 2*

A solution of 11.2 g. of 7-nitro-5-phenyl-3H-1,4-benzodiazepin-2(1H)-one and 2.2 g. of sodium methoxide in 80 ml. of dimethylformamide was stirred at room temperature for 30 minutes. A solution of 0.045 mole of dimethylaminoethyl chloride in 80 ml. of benzene prepared as in Example 1 was added and the reaction mixture was heated on the steambath for ½ hour. It was then poured into cold dilute hydrochloric acid and extracted with benzene to remove impurities. The aqueous part was made alkaline with concentrated potassium hydroxide and the reaction product was extracted with methylene chloride. The organic layer was separated, dried, and concentrated in vacuo. The residue was dissolved in cold methanol and treated with an excess of ca. 8 N methanolic hydrogen chloride. Ether was added and the crystalline substance filtered off. Recrystallization from a mixture of methanol, ether and some added methanolic hydrogen chloride yielded 1-(2-dimethylaminoethyl)-7-nitro-5-phenyl-3H-1,4-benzodiazepin-2(1H)-one dihydrochloride as colorless prisms melting at 232–3°.

An aqueous solution of 1 g. of the above-obtained dihydrochloride was made alkaline with cold dilute sodium hydroxide and extracted with methylene chloride. The organic layer was dried and concentrated into vacuo to dryness. The residual free base was recrystallized several times from a mixture of ether and petroleum ether and formed colorless prisms of 1-(2-dimethylaminoethyl)-7-nitro-5-phenyl-3H-1,4-benzodiazepin-2(1H) - one melting at 121–2°.

The above-mentioned 7-nitro-5-phenyl-3H-1,4-benzodiazepin-2(1H)-one, intermediates therefor and the preparation thereof, are not a part of this invention, but such are set forth herein below in order that this disclosure may be complete.

A mixture of 16.8 g. of 2-aminobenzophenone, 11.9 g. of glycine ethyl ester hydrochloride and 200 cc. of pyridine was heated to reflux. After one hour, 20 cc. of pyridine was distilled off. The solution was refluxed for 15 hours, then 11.9 g. of glycine ethyl ester hydrochloride was added and the refluxing was continued for an additional 4 hours. The reaction mixture was concentrated in vacuo, then diluted with ether and water. The reaction product, 5-phenyl-3H-1,4-benzodiazepin-2(1H)-one, crystallized out, was filtered off and then recrystallized from acetone in the form of colorless rhombic prisms, M.P. 182–183°.

48 g. of 5-phenyl-3H-1,4 - benzodiazepin - 2(1H)-one was dissolved in 250 cc. of concentrated sulfuric acid by stirring at 15° for ½ hour. The solution was then cooled to 0° and a mixture of 9.1 cc. of fuming nitric acid (90%—sp. gr.=1.50) and 11.8 cc. of concentrated sulfuric acid was added dropwise with stirring, keeping the temperature of the reaction mixture between —5° and 0°. After completion of the addition of the nitric acid-sulfuric acid mixture, stirring was continued for 1 hour and the reaction mixture was stored in the refrigerator overnight.

The mixture was then added dropwise to 2 kg. of crushed ice with stirring and cooling, keeping the temperature at 0°. After 1 hour of stirring in the cold, 640 cc. of concentrated ammonium hydroxide was added dropwise at 0° to pH 8. Stirirng was continued for ½ hour and the crude product was filtered off, washed with a small amount of ice water and sucked dry overnight. The crude product was suspended in a mixture of 100 cc. of methylene chloride and 1700 cc. of alcohol. 50 g. of decolorizing charcoal was added and the mixture was refluxed with stirring for 2 hours. After standing overnight at room temperature 15 g. of diatomaceous earth filter aid was added and the refluxing was resumed for 1½ hours. The mixture was filtered while hot. The clear, light yellow filtrate was concentrated in vacuo on the steambath with stirring to about 600 cc. The concentrate was stirred and cooled in ice for about 2 hours; the precipitated crystalline product was filtered off, washed with some petroleum ether and sucked dry. The product, 7-nitro-5-phenyl-3H-1,4 - benzodiazepin-2(1H)-one, was recrystallized from a mixture of 1000 cc. of alcohol and 50 cc. of methylene chloride to obtain white prisms melting at 224–225°.

*Example 3*

A solution of 6 g. of 5-phenyl-7-trifluoromethyl-3H-1,4-benzodiazepin-2(1H)-one and 1.1 g. of sodium methoxide was stirred at room temperature for one hour. A solution of 0.022 mole dimethylaminoethyl chloride in 60 ml. benzene prepared as in Example 1 was added to the reaction mixture and the stirring continued for 4 hours at room temperature and one hour at 60°. The reaction mixture was cooled, poured into ice cold dilute hydrochloric acid and extracted with methylene chloride. The aqueous part was made alkaline with potassium hydroxide solution and extracted with methylene chloride. The organic layer was dried and concentrated in vacuo to dryness. The residue was treated with a mixture of ether and petroleum ether and filtered. The filtrate was concentrated in vacuo and the residue dissolved in methanol. An excess of 8 N methanolic hydrogen chloride and ether was added and crude crystalline 1-(2-dimethylaminoethyl)-5-phenyl-7-trifluoromethyl-3H - 1,4-benzodiazepin-2(1H)-one dihydrochloride was filtered off. After recrystallization from a mixture of methanol, ether and a few drops of methanolic hydrogen chloride, the product formed colorless needles discoloring at 170° and melting at about 217–221°.

The above-mentioned 5-phenyl-7-trifluoromethyl-3H-1,4-benzodiazepin-2(1H)-one, intermediates therefor and the preparation thereof, are not a part of this invention, but such are set forth herein below in order that this disclosure may be complete.

80 g. of sodium nitrite were added slowly with stirring to 460 ml. of concentrated sulfuric acid. After heating to 70°, a clear solution was obtained. This solution was cooled and 200 g. of 2-chloro-5-trifluoromethylaniline were slowly added at a temperature between 10 and 20°. The reaction mixture was stirred for one hour at 20° and then poured onto a mixture of 200 g. of sodium chloride and 1.6 kg. of ice. Excess sodium chloride was filtered off. A solution of 280 g. of zinc chloride in 300 ml. of water was added to the filtrate whereupon a zinc chloride double salt of the corresponding diazonium compound precipitated. After standing overnight at 0°, the double salt was filtered off and washed with a cold saturated salt solution.

To a solution of 120 g. of sodium cyanide and 72 g. of cuprous cyanide in 300 ml. of water were added with stirring and cooling with ice, 291 g. of the wet zinc chloride double salt. After the addition of 24 g. of sodium carbonate, the mixture was first stirred for one hour at 20° and then at 70° for an additional ½ hour. The reaction mixture was cooled and extracted with ether to obtain crude 2-chloro-5-trifluoromethylbenzonitrile. The product was purified by steam distillation and crystallization of the organic part of the distillate from hexane to give the pure compound, M.P. 39–40°.

To a solution of phenylmagnesium bromide, prepared from 9.5 g. of magnesium, 58.5 g. of bromobenzene and 500 ml. of anhydrous ether, was added with stirring a solution of 39 g. of 2-chloro-5-trifluoromethylbenzonitrile in 200 ml. of benzene. 400 ml. of solvent were distilled off and the reaction mixture was then refluxed for 16 hours. The Grignard complex was decomposed with 40 g. of ammonium chloride and 200 g. of ice. The mixture was then extracted with benzene. 2-chloro-5-trifluoromethylbenzophenone imine hydrochloride was precipitated from the benzene solution by the addition of 40 ml. of concentrated hydrochloric acid. The product was filtered off, washed with benzene and dried in vacuo, M.P. 248–251°, and upon further purification melted at 250–262°.

60 g. of 2-chloro-5-trifluoromethylbenzophenone imine hydrochloride were refluxed overnight with a mixture of 300 ml. of toluene and 300 ml. of 25% sulfuric acid while stirring. The toluene layer was separated, washed with water, dried, concentrated in vacuo and the residue crystallized from hexane to yield pure 2-chloro-5-trifluoromethylbenzophenone, M.P. 39–40°.

50 g. of 2-chloro-5-trifluoromethylbenzophenone and 500 ml. of concentrated aqueous ammonia were reacted in a closed vessel for 10 hours at 140° in the presence of 10 g. of cuprous chloride catalyst. The reaction product was extracted with ether. The ether extract was concentrated in vacuo, the residue dissolved in hexane and purified by chromatography using a 10 fold amount of neutral alumina (Brockmann activity state II). Elution with a hexane-ether mixture (1:1) and evaporation of the solvent gave 2-amino-5-trifluoromethylbenzophenone which was recrystallized from hexane to give yellow crystals, M.P. 81–82°.

2 g. of 2-amino-5-trifluoromethylbenzophenone in 50 ml. of pyridine were refluxed for 1½ hours with 2.0 g. of glycine ethyl ester hydrochloride. After that, another 1.0 g. of glycine ethyl ester hydrochloride in 2 ml. of pyridine were added. Then 3 ml. of the solvent were distilled off. Refluxing was continued for an additional 2½ hours. The reaction mixture was extracted with benzene, the organic layer was washed with water and dried over sodium sulfate. After evaporation of the solvent, a crude oil was obtained which was dissolved in hexane. After 2 days of 0°, the precipitated pure crystalline 7-trifluoromethyl-5-phenyl-3H-1,4-benzodiazepin-2(1H)-one was filtered off. It melted at 198–199°.

*Example 4*

A stirred mixture of 5.52 g. of sodium and 300 ml. of anhydrous methanol was briefly refluxed with protection from atmospheric moisture. The resulting solution of sodium methoxide was stirred and cooled in an ice bath during the addition in one portion of 54.2 g. of 7-chloro-5-phenyl-3H-1,4-benzodiazepin-2(1H)-one. 100 ml. of anhydrous dimethylformamide was then added to effect solution of some undissolved material, and the homogeneous mixture stirred for two hours at room temperature to complete formation of the sodium salt of 7-chloro-5-phenyl-3H-1,4-benzodiazepin-2(1H)-one. The mixture was then stirred in an ice bath during the dropwise addition during 1 hour of a toluene solution of 0.35 mole of 2-chloro-N,N-diethylethylamine. Stirring was continued for a further two hours at 0° followed by an overnight period at room temperature. The mixture was then concentrated in vacuo at 20° to remove the more volatile solvents; the residue poured into 1.5 liters of ice water and the resulting mixture extracted with methylene chloride. The resulting mixture was washed with water, dried over anhydrous sodium sulfate and evaporated giving a brown gum which was treated with one liter of water and sufficient 3 N hydrochloric acid to render the solution acidic, followed by extraction with one liter of ether to remove non-basic impurities. The aqueous layer was then made basic by addition of 3 N sodium hydroxide solution, the mixture meanwhile being cooled in an ice bath. The resulting precipitate was extracted with ether, the extracts washed with water, dried over anhydrous sodium sulfate and evaporated, yielding a pale brown gum which was mixed with methanolic hydrochloric acid (1.1 equivalent) and filtered. The filtrate was diluted with ether and the resulting precipitate filtered off and recrystallized from methanol/ether yielding the hydrochloride of 7-chloro-1-(2-diethylaminoethyl)-5-phenyl-3H-1,4-benzodiazepin-2(1H)-one which was converted to the free base by treatment with excess dilute sodium hydroxide solution and extraction of the product with methylene chloride. The methylene chloride extract was then washed with water, dried over anhydrous sodium sulfate, dissolved in methylene chloride and chromatographed on a column of Woelm activity III neutral alumina (used in a quantity of about 10–20 times the weight of the crude product). The first fraction was crystallized from hexane and recrystallized several times from pentane yielding 7-chloro-1-(2-diethylaminoethyl)-5-phenyl-3H-1,4-benzodiazepin-2(1H)-one as colorless prisms melting at 79–81°.

The above-mentioned toluene solution of 2-chloro-N,N-diethylethylamine was prepared by adding 0.35 mole of the solid hydrochloride of the amine portionwise to a stirred mixture of a 50% aqueous sodium hydroxide solution (made from 0.39 mole of sodium hydroxide) and 200 ml. of toluene, cooled in an ice bath. The resulting toluene solution was decanted from the nearly solid mush of inorganic precipitate which was then washed by decantation with 50 ml. of toluene. The combined toluene extracts were then dried for 15 minutes over anhydrous potassium carbonate at 5°, filtered and stored at 5° until used.

*Example 5*

A toluene solution of 0.35 mole of 2-chloro-N,N-dimethylethylamine prepared as in Example 4 was added dropwise with stirring during one hour to an ice bath containing the sodium salt of 54.2 g. of 7-chloro-5-phenyl-3H-1,4-benzodiazepin-2(1H)-one, also prepared as in Example 4 above. Stirring was continued for a further two hours at 0° followed by an overnight period at room temperature. The mixture was then concentrated in vacuo at 20° the residue poured into 1.5 liters of ice water, the resulting mixture extracted with methylene chloride, the methylene chloride extract washed with water, dried over anhydrous sodium sulfate and evaporated, yielding a brown gum. This material was treated with one liter of water and sufficient 3 N hydrochloric acid to render the solution acidic, followed by extraction with one liter of ether. The remaining aqueous layer was rendered basic by the addition of 3 N sodium hydroxide solution with concurrent cooling of the mixture in an ice bath. The resulting precipitate was extracted, washed with water, dried over anhydrous sodium sulfate and evaporated, yielding a pale brown gum which was mixed with methanolic hydrochloric acid (1.1 equivalents) and filtered. The filtrate was diluted with ether and the resulting precipitate, consisting of the hydrochloride of 7-chloro-1-(2-dimethylaminoethyl)-5-phenyl-3H-1,4-benzodiazepin-2(1H)-one, was filtered off and recrystallized from ethanol/ether. It was then converted to the free base by treatment with excess dilute sodium hydroxide solution and extraction with methylene chloride. The methylene chloride extract was then washed with water, dried over anhydrous sodium sulfate and evaporated, yielding a residue which was crystallized several times from ether/hexane yielding 7-chloro-1-(2-dimethylaminoethyl)-5-phenyl-3H-1,4-benzodiazepin-2(1H)-one as pale yellow prisms melting at 96–98°.

*Example 6*

A toluene solution of 0.35 mole of 3-chloro-N,N-dimethylpropylamine prepared as in Example 4 was added dropwise during one hour with stirring and cooling in an ice bath to a solution of the sodium salt of 54.2 g. of 7-chloro-5-phenyl-3H-1,4-benzodiazepin-2(1H) - one, also prepared as in Example 4 above. Stirring was continued for a further two hours at 0° followed by an overnight period at room temperature. The mixture was then concentrated in vacuo at 20°, the residue poured into 1.5 liter of ice water, the resulting mixture extracted with methylene chloride, the extract washed with water, dried over anhydrous sodium sulfate and evaporated, yielding a residue which was treated with one liter of water and sufficient 3 N hydrochloric acid to render the resulting solution acidic, followed by extraction with one liter of ether. The remaining aqueous layer was then made basic by addition of 3 N sodium hydroxide solution with concurrent cooling in an ice bath. The resulting precipitate was extracted with ether, the extract washed with water, dried over anhydrous sodium sulfate and evaporated, yielding a pale yellow gum which was mixed with methanolic hydrochloric acid (1.1 equivalents). The resulting mixture was filtered, the filtrate diluted with ether and the resulting precipitate, consisting of the hydrochloride of 7-chloro-1-(3-dimethylaminopropyl)-5-phenyl-3H-1,4-benzodiazepin-2(1H)-one, filtered off and recrystallized from methanol/ether. To obtain the free base, the hydrochloride was treated with excess sodium hydroxide solution followed by extraction with methylene chloride. The methylene chloride extract was then washed with water, dried over anhydrous sodium sulfate, redissolved in methylene chloride and chromatographed on a column of Woelm activity III neutral alumina (using a quantity of alumina about 10–20 times the weight of crude product to be purified). The first fraction was recrystallized from hexane yielding colorless prisms of 7-chloro-1-(3-dimethylaminopropyl)-5-phenyl-3H-1,4 - benzodiazepin-2 (1H)-one melting at 94–96°.

Example 7

13 g. of 7-chloro-5-(2-fluorophenyl)-3H-1,4-benzodiazepin-2(1H)-one was dissolved in 100 ml. of N,N-dimethylformamide and treated with 10.3 ml. of a solution of sodium methoxide in methanol containing 54 m. moles, or 2.95 g. of sodium methoxide. The resulting solution was stirred at room temperature for one hour and then cooled in an ice/salt mixture to 0°. A solution of diethylaminoethyl chloride was prepared by dissolving 13.8 g. of diethylaminoethyl chloride hydrochloride in cold dilute sodium hydroxide solution and extracting the base with toluene (4 x 50 ml.). The toluene extracts were combined, dried over anhydrous sodium sulfate, filtered and added to the reaction mixture. The mixture was allowed to stand for seventy hours and then concentrated to a small volume under reduced pressure. The residue was dissolved in 100 ml. of methylene chloride, washed with 75 ml. of water, saturated brine solution (3 x 50 ml.), and filtered over grade 1 neutral alumna. The filtrate was evaporated to dryness and the resulting colorless oil taken up in ether, which was then saturated with hydrogen chloride. The pale yellow precipitate was filtered off and recrystallized from methanol/ether yielding 7-chloro-1-diethylaminoethyl-5-(2-fluorophenyl)-3H-1,4-benzodiazepin - 2(1H)-one dihydrochloride as pale yellow rods melting at 190–220°.

The above-mentioned 7-chloro-5-(2-fluorophenyl)-3H-1,4-benzodiazepin-2(1H)-one, intermediates therefor and the preparation thereof, are not a part of this invention, but such are set forth hereinbelow in order that this disclosure may be complete.

A mixture of 176 g. of o-fluorobenzoyl chloride and 64 g. of p-chloroaniline was stirred and heated to 180°, at which temperature 87 g. of zinc chloride was introduced, the temperature raised to 200–205° and maintained there for forty minutes. The golden colored melt was quenched by the addition of 500 ml. of 3 N hydrochloric acid and the resulting mixture refluxed for 5 minutes. The acid solution was decanted and the process repeated three times to remove all o-fluorobenzoic acid. The grey granular residue was dissolved in 300 ml. of 75% (vol./vol.) sulfuric acid and refluxed for 40 minutes to complete hydrolysis. The hot solution was poured over 1 kg. of ice and diluted to 2 liters with water. The organic material was extracted with four 300 ml. portions of methylene chloride which were subsequently washed with two 500 ml. portions of 3 N hydrochloric acid to remove traces of p-chloroaniline, three 500 ml. portions of sodium hydroxide solution to remove o-fluorobenzoic acid, and finally two 200 ml. portions of saturated brine solution. The methylene chloride extract was dried over anhydrous sodium sulfate and the solvent removed to give the crude aminobenzophenone. Recrystallization from methanol gave 2-amino-5-chloro-2′-fluorobenzophenone as yellow needles, M.P. 94–95°.

A mixture of 20 g. of 2-amino-5-chloro-2′-fluorobenzophenone and 35 g. of glycine ethyl ester hydrochloride was refluxed in 200 ml. of pyridine, containing 0.5 ml. of piperidine, for 18 hours. The mixture was distilled until 100 ml. of pyridine had been collected, and the residue poured into water. The remaining pyridine was neutralized with dilute hydrochloric acid and the product extracted with two 100 ml. portions of methylene hydrochloride. The extracts were combined, washed well with water and saturated brine solution, dried over anhydrous sodium sulfate, and the solvent removed under reduced pressure. The oil remaining was dissolved in acetone, treated with charcoal (Norite), filtered and recrystallized from a mixture of acetone and hexane to give 7-chloro-5-(2-fluorophenyl)-3H-1,4-benzodiazepin - 2(1H)-one as white needles, M.P. 205–206°.

Example 8

To a suspension of 23 g. of 7-chloro-5-phenyl-3H-1,4-benzodiazepin-2(1H)-one 4-oxide in 100 ml. of chlorobenzene was added 3.3 g. of sodium methoxide. About 20 cc. of the solvent was distilled off at atmospheric pressure, and a solution of 0.16 mole of diethylaminoethyl chloride in about 80 cc. of chlorobenzene was added. The reactions mixture was refluxed for 4 hours, cooled and extracted with dilute hydrochloric acid. The aqueous layer containing the reaction product was separated, made alkaline with cold dilute sodium hydroxide and extracted with ether. The ether layer was separated, dried and concentrated in vacuo to dryness. The residue was crystallized from ether and yielded 1-(2-diethylaminoethyl)-7-chloro-5-phenyl-3H-1,4-benzodiazepin-2(1H)-one 4-oxide which upon being crystallized from ether formed colorless plates melting at 121–2°.

The solution of diethylaminoethyl chloride was prepared from the hydrochloride in the same manner as described in Example 1 using instead of toluene, chlorobenzene as solvent.

Example 9

A solution of 3.85 g. of 1-(2-diethylaminoethyl)-7-chloro-5-phenyl-3H-1,4-benzodiazepin-2(1H)-one 4 oxide in 30 cc. of methanol was hydrogenated at room temperature and atmospheric pressure in the presence of about 2 g. of wet Raney nickel. After the absorption of the calculated amount of hydrogen the solution was filtered and the filtrate concentrated in vacuo. The residue was extracted with hexane, the hexane solution concentrated in vacuo and the residue crystallized from a mixture of ether and pentane to give colorless prisms of 7-chloro-1-(2-diethylaminoethyl)-5-phenyl-3H - 1,4 - benzodiazepin-2(1H)-one melting at 79–81°.

Example 10

6.7 g. of 7-chloro-1,3-dihydro-5-phenyl-2H-1,4-benzodiazepin-2-one was dissolved in anhydrous dimethylformamide (40 ml.) and converted to the sodium salt by the addition of 6 ml. of 25% methanolic sodium methoxide solution. The mixture was stirred and heated on a steam bath for 30 minutes with protection from atmospheric moisture. The mixture was cooled to 30° and treated with 1-bromo-3-chloropropane (2.66 ml., 0.0275 mole) with stirring at 20° for 66 hours. The mixture was evaporated in vacuo and extracted with methylene chloride (100 ml.). The washed and dried methylene chloride extract was evaporated in vacuo to give the crude product as an oil. The crude product was crystallized from a mixture of hexane (50 ml.) and ether (10 ml.) to give 7 - chloro-1-(3-chloropropyl)-1,3-dihydro-5-phenyl-2H-1,4-benzodiazepin-2-one, M.P. 87–90° C.

10 g. of 7-chloro-1-(3-chloropropyl)-1,3-dihydro-5-phenyl-2H-1,4-benzodiazepin-2-one was dissolved in 50 ml. of methyl ethyl ketone and treated with 4.37 g. of sodium iodide and 0.0576 mole of diethylamine. The mixture was stirred and refluxed for 18 hours and was then evaporated in vacuo. The residue was extracted with methylene chloride (100 ml.) and washed with water and extracted again with .3 N hydrochloric acid (2 x 60 ml.). The aqueous acid layer was made basic with 4 N sodium hydroxide solution and the resulting precipitated product was extracted with methylene chloride, washed and then dried to give 7-chloro-1-(3-diethylaminopropyl) - 1,3 - dihydro - 5 - phenyl-2H-1,4-benzodiazepin-2-one, M.P. 89–91°.

This compound formed a water soluble maleate which was prepared by dissolving the compound in methanol followed by the addition of a methanolic solution containing the calculated amount of maleic acid for the formation of the mono-maleate of 7-chloro-1-(3-diethylaminopropyl) - 1,3 - dihydro - 5 - phenyl-2H-1,4-benzodiazepin-2-one. The maleate was recrystallized from methanol.

*Example 11*

An alternate procedure is given hereinbelow for the preparation of 7-chloro-1-(3-diethylaminopropyl)-1,3-dihydro-5-phenyl-2H-1,4-benzodiazepin-2-one.

.10 mole of 7-chloro-1,3-dihydro-5-phenyl-2H-1,4-benzodiazepin-2-one was dissolved in 250 ml. of anhydrous dimethylformamide and converted to the sodium salt by the addition of 0.11 mole of sodium methoxide, followed by stirring and heating of the reaction mixture on a steam bath for 15 minutes. A solution of 0.11 mole of 3-diethylaminopropyl chloride in anhydrous toluene (200 ml.) was then carefully added to the heated mixture for about 30 minutes. Stirring and heating on the steam bath was continued for 1½ hours and then the mixture was concentrated in vacuo at 50–60°. The resulting concentrated solution was poured slowly into a mixture of ice and water, resulting in the precipitation of the crude product. The crude product was purified by the addition of sufficient 3 N hydrochloric acid to an aqueous suspension of the crude product to make the solution strongly acidic (pH<1). Nonbasic impurities were removed by extraction with ether (1 l.). The aqueous acid layer was cooled and made basic by addition of 3 N sodium hydroxide solution. The resulting precipitated product was isolated by extraction with methylene chloride and evaporation of the washed and dried extract. Recrystallizations from hexane gave 7-chloro-1-(3-diethylaminopropyl)-1,3 - dihydro - 5 - phenyl-2H-1,4-benzodiazepin-2-one, M.P. 88–90° C.

This compound was converted to the dihydrochloride by dissolving it in cold methanolic 2 N-hydrochloric acid (2.2–2.4 equivalents) and evaporating the solution at 20°. The residue was crystallized by trituration with anhydrous ether. Recrystallizing from an ethanol-acetone-ether mixture gave 7-chloro-1-(3-diethylaminopropyl)-1,3-dihydro-5-phenyl-2H-1,4-benzodiazepin - 2 - one having a melting point of 208–210° as a dihydrochloride.

*Example 12*

0.10 mole of 7-chloro-1,3-dihydro-5-phenyl - 2H-1,4-benzodiazepin-2-one was reacted with 0.11 mole of 3-dimethylaminoisopropyl chloride according to the procedure set out in Example 11. The crude product was purified by the addition of sufficient 3 N hydrochloric acid to the aqueous suspension of the crude product to make the solution strongly acidic (pH<1). The nonbasic impurities were removed by extraction with ether (1 l.) and then the aqueous acid layer was cooled and made basic by addition of 3 N sodium hydroxide solution. The resulting precipitated product was isolated by extraction with methylene chloride and evaporation of the washed and dried extract. Recrystallizations from hexane gave 7 - chloro-1,3-dihydro-1-(2-dimethylamino-1-methylethyl)-5-phenyl-2H-1,4-benzodiazepin-2-one, M.P. 134–135°.

The dihydrochloride of 7-chloro-1,3-dihydro-1-(2-dimethylamino - 1 - methylethyl)-5-phenyl-2H-1,4-benzodiazepin-2-one was prepared by dissolving the base in cold methanolic 2 N hydrochloric acid (2.2–2.4 equivalents) and evaporating the resulting solution at 20°. The residue was crystallized by trituration with anhydrous ether. The dihydrochloride was recrystallized from a mixture of isopropanol and ether and was found to have a melting point of 165–168°.

*Example 13*

.10 mole of 7 - chloro-1,3-dihydro-5-phenyl-2H-1,4-benzodiazepin-2-one was reacted with 0.11 mole of N-(2-chloroethyl)-pyrrolidine according to the procedure set out in Example 11. The crude product was purified by the addition of 3 N hydrochloric acid in the manner set out in Example 11 yielding a yellow gum. The gum was recrystallized from hexane to give 7-chloro-1,3-dihydro-5 - phenyl-1-(2-pyrrolidinoethyl)-2H-1,4-benzodiazepin-2-one, M.P. 106–107°.

The monomaleate of 7-chloro-1,3-dihydro-5-phenyl-1-(2-pyrrolidinoethyl)-2H-1,4-benzodiazepin-2-one was prepared by dissolving the base in methanol followed by the addition of a methanolic solution containing the calculated amount of maleic acid for the formation of the said monomaleate. The monomaleate was recrystallized from acetone and was found to have a melting point of 157–159°.

*Example 14*

10 g. of 7-chloro-1-(3-chloropropyl)-1,3-dihydro-5-phenyl-2H-1,4-benzodiazepin - 2 - one was reacted with 0.0576 mole of N-methyl-piperazine according to the procedure set out in Example 10 to give crude 7-chloro-1,3-dihydro - 1 - [3-(4-methyl-1-piperazinyl)-propyl]-5-phenyl-2H-1,4-benzodiazepin-2-one as an oil.

Crude 7 - chloro - 1,3 - dihydro-1-[3-(4-methyl-1-piperazinyl)-propyl] - 5 - phenyl-2H-1,4-benzodiazepin-2-one was converted to the dimaleate by dissolving the latter in ethanol, followed by the addition of an acetone solution containing the calculated amount of maleic acid for the formation of the dimaleate. Recrystallizations from methanol gave 7-chloro - 1,3 - dihydro-1-[3-(4-methyl-1-piperazinyl)-propyl] - 5 - phenyl-2H-1,4-benzodiazepin-2-one dimaleate, M.P. 180–182°.

*Example 15*

7 - chloro - 1 - (3-chloropropyl)-1,3-dihydro-5-phenyl-2H-1,4-benzodiazepin-2-one (10 g., 0.0288 mole) was reacted with 0.0576 mole of N-(2-hydroxyethyl)-piperazine according to the procedure set out in Example 10 to give the crude product as an oil. This was converted to the dimaleate according to the procedure set out in Example 14. Recrystallizations from acetone gave 7-chloro - 1,3 - dihydro-1-[3-(4-(2-hydroxyethyl)-1-piperazinyl)propyl]-5-phenyl - 2H - 1,4 - benzodiazepin-2-one dimaleate, M.P. 121–123°.

*Example 16*

.10 mole of 7-chloro - 1,3 - dihydro-5-phenyl-2H-1,4-benzodiazepin-2-one was dissolved in anhydrous dimethylformamide (250 ml.) and converted to the sodium salt by the addition of 0.11 mole of solid sodium methoxide. The reaction mixture was stirred and heated on a steam bath for 15 minutes. A solution of 2-bromoethyl chloride (0.11 mole) in 200 ml. of anhydrous toluene was then carefully added to the heated mixture during about 30 minutes. Stirring and heating on the steam bath were continued for a further 1½ hours and then the mixture was concentrated in vacuo at 50–60°. The resulting concentrated solution was poured slowly into a mixture of ice and water resulting in the precipitation of the crude product. The crude product was purified by chromatography of a benzene solution of the crude product over a column of alumina. Evaporation of the eluate and recrystallization of the resulting residue from an acetone-hexane mixture gave 7-chloro-1-(2-chloroethyl) - 1,3 - dihydro - 5 - phenyl-2H-1,4-benzodiazepin-2-one, M.P. 168–169°.

*Example 17*

10 g. of 7 - chloro - 1 - (3 - chloropropyl) - 1,3-dihydro-5 - phenyl - 2H - 1,4 - benzodiazepin-2-one was reacted with 0.0576 mole of piperazine according to the procedure set out in Example 10 to give 7-chloro-1,3-dihydro - 5 - phenyl-1-[3-(1-piperazinyl)propyl]-2H-1,4-benzodiazepin-2-one as an oil. This substance was converted to the dimaleate according to the procedure set out in Example 14. Recrystallization from acetone gave 7 - chloro - 1,3 - dihydro-5-phenyl-1-[3-(1-piperazinyl) propyl] - 2H - 1,4 - benzodiazepin-2-one dimaleate, M.P. 120–122°.

Example 18

0.10 mole of 7 - chloro - 1,3 - dihydro-5-phenyl-2H-1,4-benzodiazepin-2-one was reacted with 0.11 mole of 1-(2-chloroethyl) - 4 - methyl-piperazine according to the procedure set out in Example 11. The crude product was purified according to the method set out in Example 11. Recrystallizations from an acetone-hexane mixture gave 7 - chloro - 1,3 - dihydro - 1 - [2-(4-methyl-1-piperazinyl)ethyl]-5-phenyl - 2H - 1,4 - benzodiazepin-2-one, M.P.159–160°.

The dimaleate of this compound was prepared according to the method set out in Example 14. Recrystallizations from a methanol-acetone mixture gave 7-chloro-1,3 - dihydro - 1 - [2-(4-methyl-1-piperazinyl)ethyl]-5-phenyl - 2H - 1,4 - benzodiazepin-2-one dimaleate, M.P. 156–160°.

Example 19

0.10 mole of 7 - chloro - 1,3 - dihydro-5-phenyl-2H-1,4-benzodiazepin-2-one was reacted with 0.11 mole of N-(2-chloroethyl)-piperazine according to the procedure set out in Example 11. The crude product was purified by the method set out in Example 11. This resultant material was converted to the dimaleate according to the procedure set out in Example 14. Recrystallization from a methanol-acetone solution gave 7-chloro-1,3-dihydro-5-phenyl - 1 - (2-piperazinoethyl)-2H-1,4-benzodiazepin-2-one dimaleate, M.P. 172–178°.

Example 20

0.10 mole of 7 - chloro - 1,3 - dihydro-5-phenyl-2H-1,4-benzodiazepin-2-one was reacted with 0.11 mole of β-morpholinoethyl chloride according to the procedure set out in Example 11. The crude product was purified according to the method set out in Example 11 and was obtained as a yellow, partly crystalline solid. Recrystallizations from an acetone-hexane mixture gave 7-chloro-1,3 - dihydro - 1 - (2-morpholinoethyl)-5-phenyl-2H-1,4-benzodiazepin-2-one, M.P. 144–146° C.

The monomaleate was prepared according to the method set out in Example 13. Recrystallizations from acetone gave colorless prisms, M.P. 156–157° C.

Example 21

0.10 mole of 7 - chloro - 1,3 - dihydro-5-phenyl-2H-1,4-benzodiazepin-2-one was reacted with 0.11 mole of N-(2-chloroethyl)-piperidine according to the procedure set out in Example 11. The crude product was purified according to the method set out in Example 11, and was obtained as a yellow foam. Recrystallizations from hexane gave colorless prisms of 7-chloro-1,3-dihydro-5-phenyl - 1 - (2-piperidinoethyl)-2H-1,4-benzodiazepin-2-one, M.P. 90–92° C.

The monomaleate was prepared according to the procedure set out in Example 13 above. Recrystallizations from acetone gave colorless prisms, M.P. 172–173° C.

Example 22

0.10 mole of 7-chloro-5-(2-chlorophenyl)-1,3-dihydro-2H-1,4-benzodiazepin-2-one was reacted with 0.11 mole of β-diethylaminoethyl chloride according to the method set out in Example 11. The crude product was purified by the method set out in Example 11 and was obtained as a light brown gum. Recrystallizations from hexane gave colorless needles of 7-chloro-5-(2-chlorophenyl)-1-(2-diethylaminoethyl) - 1,3 - dihydro - 2H - 1,4-benzodiazepin-2-one, M.P. 68–70° C.

Example 23

7 - chloro - 1,3 - dihydro - 5 - phenyl-2H-1,4-benzodiazepin-2-one was reacted with γ-dimethylaminopropyl chloride according to the procedure set out in Example 11. The crude product was purified by the method set out in Example 11, giving yellow crystals, M.P. 92–94° C. Recrystallizations from hexane gave colorless prisms of 7-chloro - 1,3 - dihydro - 1 - (3-dimethylaminopropyl) - 5 - phenyl-2H-1,4-benzodiazepin-2-one, M.P. 90–92° C.

Example 24

A solution of 9.75 g. (66 mmoles) of 2-(4-methylpiperazino)ethyl chloride in toluene was added, at room temperature, to a stirred solution of 34.8 mmoles of the sodio derivative of 7-chloro-5-(2-fluorophenyl)-3H-1,4-benzodiazepin-2(1H)-one in 60 ml. of N,N-dimethylformamide. The mixture was stirred at 60° for 2.5 hours, poured into 2 l. of water and extracted with methylene chloride. The combined methylene chloride extracts were washed, dried, and filtered over 50 g. of alumina. After removal of methylene chloride, the residual oil was dissolved in methanol (30 ml.). This solution was then saturated with hydrogen chloride. The addition of ether precipitated the trihydrochloride which was removed by filtration and recrystallized from a methanol-ether mixture to give 7-chloro-1-[2-(4-methylpiperazino)ethyl] - 5 - (2 - fluorophenyl)-3H-1,4- - benzodiazepin - 2(1H) - one trihydrochloride, M.P. 225–239°.

Example 25

1-bromo-3-chloropropane (7.11 g., 45.2 mmoles) was added portionwise at 0° to a stirred solution of the sodio derivative of 7-chloro-5-(2-fluorophenyl)-3H-1,4-benzodiazepin-2(1H)-one (34 mmoles in 50 ml. of N,N-dimethylformamide. The mixture was allowed to warm to room temperature, stirred for one hour and poured into 1 l. of water. The product was extracted into methylene chloride (3 x 100 ml.). The organic layers were combined, washed, dried and filtered over 50 g. of alumina. Solvent was removed and the product crystallized from an ether-petroleum ether (B.P. 30–60°) mixture to give 7-chloro-1-(3-chloropropyl) - 5 - (2 - fluorophenyl) - 1,3-dihydro-2H-1,4-benzodiazepin-2-one, M.P. 86–89°.

Example 26

The sodio derivative of 7-chloro-4-methyl-5-(2-fluorophenyl) -4,5 - dihydro - 3H-1,4-benzodiazepin-2(1H)-one (5.6 g., 18.3 mmoles) in 20 ml. of N,N-dimethylformamide was treated with a toluene solution of 2-diethylaminoethyl chloride (36.6 mmoles) as described above in Example 24. The product was isolated as the base and recrystallized from petroleum ether (B.P. 30–60°) to give 7-chloro-1-(2-diethylaminoethyl) - 4,5 - dihydro - 5 - (2-fluorophenyl) - 4 - methyl-3H-1,4-benzodiazepin-2(1H)-one, M.P. 83–85°.

The above-mentioned 7 - chloro - methyl-5-(2-fluorophenyl) - 4,5 - dihydro-3H-1,4-benzodiazepin-2(1H)-one, intermediates therefor and the preparation thereof, are not part of this invention, but such are set forth hereinbelow in order that this disclosure may be complete.

A solution of 5.9 g. (0.0197 mole) of 7-chloro-5-(2-fluorophenyl) - 3H - 1,4-benzodiazepin - 2(1H) - one in 60 ml. of glacial acetic acid was hydrogenated at room temperature and atmospheric pressure in the presence of .6 g. of platinum oxide until 0.0197 mole of hydrogen was absorbed. The mixture was then filtered, removed under reduced pressure and a crystalline product was obtained. Recrystallization from acetone gave 7-chloro-4,5-dihydro-5-(2-fluorophenyl) - 3H - 1,4 - benzodiazepin-2(1H)-one as white needles melting at 214–215°.

A solution of 16 g. of 7-chloro-5-(2-fluorophenyl)-4,5-dihydro-3H-1,4-benzodiazepin-2(1H)-one in 30 ml. of benzene and 10 ml. of N-N-dimethylformamide was refluxed for 15 minutes with 14.2 g. of methyl iodide. Excess methyl iodide was evaporated and 50 ml. of water added. The stirred reaction mixture was then allowed to cool. The mixture was diluted to 400 ml. with water and extracted four times with 100 ml. portions of methylene chloride. The combined extracts were filtered and dried over anhydrous sodium sulfate. Removal of the solvent and recrystallization of the residue from methylene chloride/petroleum ether (30–60°) gave 7-chloro-4-methyl-5-(2 - fluorophenyl) - 4,5 - dihydro-3H-1,4-benzodiazepin-2(1H)-one as white prisms melting at 185.6°.

The sodio derivatives of 7-chloro-5-(2-fluorophenyl)-3H-1,4-benzodiazepin-2(1H)-one were prepared by slowly adding at 0° to a stirred solution of 10 g. of the parent compound and 60 ml. of N,N-dimethylformamide, sodium methoxide in methanol (10 ml. of a solution containing 4.35 mmoles per ml.). The mixture was stirred at room temperature for 15 minutes and was then ready for use.

*Example 27*

A suspension of 0.3 g. of platinum oxide in 30 ml. of glacial acetic acid was hydrogenated. To the reduced catalyst, a solution of 7-chloro-1-methyl-5-(2-fluorophenyl)-3H-1,4-benzodiazepin-2-one (4.6 g., 15.1 mmoles) in 45 ml. of glacial acetic acid was added and the mixture hydrogenated to completion (338 ml., 15.1 mmoles $H_2$). The catalyst was removed by filtration and the acetic acid evaporated under reduced pressure. The residue was taken up in methylene chloride (50 ml.) and washed with a 30% solution of sodium carbonate (2 x 20 ml.). The resulting solution was washed alkali free, dried and concentrated. Recrystallization from an acetone-petroleum ether (B.P. 30–60°) mixture gave 7-chloro-4,5-dihydro-5 - (2 - fluorophenyl) - 1 - methyl-3H-1,4-benzodiazepin-2(1H)-one, M.P. 135–136°.

The above-mentioned 7-chloro-4,5-dihydro-5-(2-fluorophenyl) - 1 - methyl-3H-1,4-benzodiazepin - 2(1H) - one and the method of preparation thereof are not part of this invention but such are set forth hereinabove in order that this disclosure may be complete.

A solution of 7-chloro-4,5-dihydro-5-(2-fluorophenyl)-1-methyl-3H-1,4-benzodiazepin-2(1H)-one (2.0 g., 6.5 mmoles) in 10 ml. of N,N-dimethylformamide was treated with a toluene solution of diethylaminoethyl chloride (5.3 g., 34.8 mmoles). Sodium iodide (1 g., 66 mmoles) was added and the mixture was stirred at 50° for sixteen hours. Solvents were removed under reduced pressure and the residue dissolved in 75 ml. of methylene chloride. The solution was washed, dried and filtered over 10 g. of alumina and concentrated to dryness. The residue was dissolved in ether, and hydrogen chloride. The product was filtered. Recrystallization from acetone gave 7-chloro-4-(2-diethylaminoethyl) - 4,5 - dihydro - 5 - (2-fluorophenyl - 1 - methyl - 3H - 1,4 - benzodiazepin-2-(1H)-one hydrochloride, M.P. 186–93°.

*Example 28*

A solution of 26.4 g. (68.8 mmoles) of 7-chloro-1-(2-diethylaminoethyl) - 5 - (2-fluorophenyl) - 3H - 1,4-benzodiazepin-2-one (see Example 7) in 150 ml. of glacial acetic acid was reduced with hydrogen over platinum (1.5 g. of platinum oxide) as described in Example 27. Recrystallization of the product from an ether-petroleum ether (B.P. 30–60°) mixture gave 7-chloro-1-(2-diethylaminoethyl) - 4,5 - dihydro - 5 - (2-fluorophenyl) - 3H-1,4-benzodiazepin-2(1H)-one melting at 98–99°.

The dihydrochloride was prepared by passing hydrogen chloride through a methanol solution of the pure base. Addition of ether to the solution precipitated the product which was recrystallized from a methanol-ether mixture to give colorless rods, M.P. 175–190° decomposed.

*Example 29*

A mixture of 6 g. (15.5 mmoles) of 7-chloro-1-(2-diethylaminoethyl)-4,5-dihydro -5 - (2 - fluorophenyl)-3H-1,4-benzodiazepin-2(1H)-one and 8.8 g. (62 mmoles) of methyl iodide in 20 ml. of N,N-dimethylformamide was stirred for seventeen hours at room temperature. The mixture was poured into 1 l. of water and the product extracted into methylene chloride (2 x 35 ml.). The methylene chloride extracts were combined, washed, dried and evaporated. The product was recrystallized from an acetone-ether mixture to give 7-chloro-1-(2-diethylaminoethyl) - 4,5 - dihydro - 4 - methyl-5-(2-fluorophenyl) - 3H - 1,4 - benzodiazepin-2(1H)-one methyl iodide, M.P. 185–90°.

*Example 30*

A mixture of 54.6 g. (0.14 m.) of 7-chloro-1-(3-chloropropyl) - 1,3 - dihydro - 5 - (2 - fluorophenyl)-2H-1,4-benzodiazepin-2-one, 48.4 g. (0.56 m.) of anhydrous piperazine, 21 g. (0.14 m.) of sodium iodide and 300 ml. of methyl ethyl ketone was stirred and refluxed for seventeen hours. Solvents were removed under reduced pressure and the residue partitioned between methylene chloride and water. The methylene chloride layer was washed with water and the product extracted into 3 N hydrochloric acid. The acid layers were combined, made alkaline with ammonium hydroxide and the product re-extracted with methylene chloride. The combined methylene chloride extracts were then washed, dried and concentrated. The residual oil (55 g.) was converted to the hydrochloride in methanol and precipitated with ether. The product was recrystallized from a methanol-ether mixture to give 7-chloro-5-(2-fluorophenyl) - 1,3 - dihydro - 1 - (3-piperazinopropyl)-2H-1,4-benzodiazepin-2-one hydrochloride, M.P. 235–255° decomposed.

*Example 31*

A mixture of 11.8 g. (32.5 mmoles) of 7-chloro-1-(3-chloropropyl) - 1,3 - dihydro - 5 - (2-fluorophenyl)-2H-1,4-benzodiazepin-2-one, 4.85 g. (48.5 mmoles) of N-methylpiperazine, 4.9 g. (32.5 mmoles) of sodium iodide and 200 ml. of methyl ethyl ketone was reacted and worked up as described in Example 30 to give the base as an oil. A solution of this material in 100 ml. of methanol was treated with a solution of 4.5 g. of maleic acid in 100 ml. of methanol. The resulting salt was obtained by filtration and recrystallized from methanol to give 7-chloro-5-(2-fluorophenyl)-1,3-dihydro-1-[3-(4-methylpiperazino)propyl]-2H-1,4 - benzodiazepin-2-one dimaleate, M.P. 185–7°.

*Example 32*

A mixture of 10.26 g. (28.2 mmoles) of 7-chloro-1-(3 - chloropropyl) - 1,3 - dihydro - 5 - (2-fluorophenyl)-2H-1,4-benzodiazepin-2H-one, 7.3 g. (64 mmoles) of N-β-hydroxyethylpiperazine, 4.2 g. (28.2 mmoles) of sodium iodide and 100 ml. of methyl ethyl ketone was reacted and worked up as described in Example 30 to give 7-chloro-5-(2-fluorophenyl) - 1,3 - dihydro - 1 - (3-[4-(2-hydroxyethyl)piperazino]propyl) - 2H - 1,4-benzodiazepin-2-one dimaleate, M.P. 120–123°.

*Example 33*

A mixture of 20 g. (48 mmoles) of 7-chloro-5-(2-fluorophenyl) - 1,3 - dihydro - 1 - (3 - piperazinopropyl)-2H-1,4-benzodiazepin-2-one, 8.2 g. (96 mmoles) of β-chloroethylvinyl ether, 6.63 g. (48 mmoles) of potassium carbonate and 100 ml. of toluene was refluxed and stirred for nineteen hours. A solution of this mixture in 100 ml. of methanol was treated with a solution of 4.5 g. of maleic acid in 100 ml. of methanol. 7-chloro-5-(2-fluorophenyl)-1,3-dihydro-1-(3-[4 - (2 - vinyloxyethyl)piperazino]propyl)-2H-1,4-benzodiazepin-2-one dimaleate was isolated from an acetone solution and recrystallized from acetone to give yellow prisms, M.P. 115–122°.

Example 34

A mixture of 20 g. (48 mmoles) of 7-chloro-5-(2-fluorophenyl)-1,3-dihydro - 1 - (3 - piperazinopropyl)-2H-1,4-benzodiazepin-2-one, 8.46 g. (96 mmoles) of 2-chloroethyl ethyl ether, 6.63 g. (48 mmoles) of potassium carbonate and 40 ml. of toluene was reacted and worked up as described in Example 33. 7-chloro-1-(3-[4-(2 - ethoxyethyl) - 1 - piperazinyl]propyl) - 5 - (2-fluorophenyl) - 1,3 - dihydro-2H-1,4-benzodiazepin-2-one trimaleate was isolated from acetone, M.P. 125–33°.

Example 35

A solution of 3.5 g. of 1-(2-dimethylaminoethyl)-7-chloro - 1,3 - dihydro - 5 - phenyl-2H-1,4-benzodiazepin-2-one 4-oxide (0.01 mole) in a mixture of 25 ml. of ethanol and 10 ml. of 1 N hydrochloric acid was concentrated in vacuo to dryness. The residue was crystallized from a mixture of ethanol and ether. The crude reaction product was separated by filtration and recrystallized from the same solvent mixture to yield 1,3-dihydro-1-(2-dimethylaminoethyl)-7-chloro-5-phenyl - 2H - 1,4-benzodiazepin-2-one 4-oxide hydrochloride melting at 217–18°.

Example 36

A solution of 7 g. (0.02 mole) of 7-chloro-1-(2-dimethylaminoethyl - 1,3 - dihydro - 5 - phenyl-2H-1,4-benzodiazepin-2-one 4-oxide in 40 ml. of acetic anhydride was heated on the steam-bath for one hour. The reaction mixture was cooled and the precipitated 3-acetoxy-7 - chloro-1-(2-dimethylaminoethyl - 1,3 - dihydro - 5 - phenyl-2H-1,4-benzodiazepin-2-one was separated by filtration. The product had a melting point of 187–8°.

Example 37

To a stirred suspension of 4 g. (0.01 mole of 3-acetoxy - 7 - chloro - 1 - (2-dimethylaminoethyl)-1,3-dihydro-5-phenyl-2H-1,4-benzodiazepin-2-one in 60 ml. of ethanol, 20 ml. of .5 N sodium hydroxide was added at room temperature, in portions, within 45 minutes. A clear solution was obtained which was diluted with 150 ml. of water. A small amount of ether was added which caused the reaction product to crystallize. The product was separated by filtration and recrystallized from ethanol to give 7-chloro-1-(2-dimethylaminoethyl)-1,3-dihydro-3-hydroxy-5-phenyl-2H-1,4-benzodiazepin-2-one.

Example 38

A solution of 10 g. of 7-chloro-1-(3-chloropropyl)-1,3-dihydro-5-(2-fluorophenyl)-2H-1,4-benzodiazepin-2 - one, in 35 ml. of N,N-dimehtylformamide was placed in an autoclave together with 85 ml. of methylamine and heated (60°) for 20 hours at 7 atmos. The resulting mixture was poured into 150 ml. of water and extracted with dichloromethane (2 x 75 ml.). The organic layers were combined, washed with water (2 x 100 ml.) and then extracted with 3 N hydrochloric acid (3 x 50 ml.). The acid layers were combined, washed with dichloromethane (2 x 35 ml.) made basic with a 20 percent (w./w.) sodium carbonate solution and the product was extracted into dichloromethane (3 x 50 ml.). The organic layers were washed, dried and the solvent removed to give 7 - chloro - 5 - (2-fluorophenyl)-1,3-dihydro-1-(3-methylaminopropyl)-2H-1,4-benzodiazepin-2-one as a colorless oil.

The oil was dissolved in methanol to provide a 10 percent solution of the oil in methanol and the resultant solution was saturated with hydrogen chloride. A sufficient amount of ether was added to cause turbidity. The resultant mixture was allowed to cool for several hours. 7 - chloro - 5 - (2-fluorophenyl)-1,3-dihydro-1-(3-methylaminopropyl)-2H-1,4-benzodiazepin-2 - one dihydrochloride precipitated out on standing and was separated by filtration. The product was recrystallized from a methanol-ether mixture as white rods, M.P. 193–196° dec.

Example 39

A solution of 15 g. of 7-chloro-1-(3-chloropropyl)-1,3-dihydro-5-(2-fluorophenyl)-2H-1,4-benzodiazepin-2 - one and 7.4 g. of sodium iodide in 50 ml. of N,N-dimethylformamide was cooled in a Dry-Ice/acetone bath. Methylamine gas was bubbled in until a total increase in volume of 75 ml. was observed. The mixture was then stirred at room temperature under a Dry-Ice/acetone reflux condenser for 7 hours. The condenser was removed and the mixture was stirred at room temperature for an additional 18 hours.

The resultant mixture was poured into 150 ml. of water and extracted with dichloromethane (2 x 75 ml.). The organic layers were combined, washed with water (2 x 100 ml.) and then extracted with 3 N hydrochloric acid (3 x 50 ml.). The acid layers were combined, washed with dichloromethane (2 x 35 ml.), made basic with a 20 percent (w./w.) sodium carbonate solution and the product extracted into dichloromethane (3 x 50 ml.). The organic layers were washed, dried and the solvent removed to give 7-chloro-5-(2-fluorophenyl)-1,3-dihydro-1-(3-methylaminopropyl)-2H-1,4-benzodiazepin-2-one as an oil.

Example 40

A solution of 20 g. of 7-chloro-1,3-dihydro-5-(2-fluorophenyl)-2H-1,4-benzodiazepin-2-one in 100 ml. of N,N-dimethylformamide was cooled to 0° C. The so-cooled solution was treated with a solution of sodium methoxide (0.084 mole) in 10 ml. of absolute methanol and stirred for 15 minutes. 150 ml. of a toluene solution containing 0.14 mole of diethylaminopropyl chloride was then added and the mixture heated at 65° C. for 3.5 hours. Solvents were removed under reduced pressure and the residue dissolved in 100 ml. of ether. This solution was washed with water (2 x 200 ml.) and then extracted with 3 N hydrochloric acid (3 x 75 ml. ). The acid layers were combined, washed with ether (75 ml.), made basic with sodium carbonate solution (20 percent w./w.) and re-extracted with ether (2 x 100 ml.). The ether layers were combined, washed with water (100 ml.) and dried. Filtration of the solution over 100 g. of Grade 1 neutral alumina, using ethyl acetate as the eluent, gave, after removal of solvents, 7-chloro-1-(3-diethylaminopropyl)-5 - (2-fluorophenyl)-1,3-dihydro-2H-1,4-benzodiazepin-2-one as a colorless oil.

The 7 - chloro - 1-(3-diethylaminopropyl)-5-(2-fluorophenyl)-1,3-dihydro-2H-1,4-benzodiazepin-2-one dihydrochloride was prepared as in Example 38 and recrystallized from an ethanol-ether mixture as pale yellow rods, M.P. 182–192° dec.

Example 41

A solution of 75 g. (0.26 mole) of 7-chloro-5-(2-fluorophenyl)-1,3-dihydro-2H-1,4-benzodiazepin-2-one in 200 ml. of N,N-dimethylformamide was treated first with 30 ml. of a methanolic solution of sodium methoxide (0.312 mole $NaOCH_3$), stirred at room temperature for 20 minutes, and then with 55 g. of 1-bromo-4-chlorobutane. The mixture was stirred at 60° for 6 hours and then solvents were removed under reduced pressure. The residue was partitioned between 100 ml. of dichloromethane and 200 ml. of water and the layers separated. The aqueous layer was washed with 50 ml. of dichloromethane, the organic layers were combined and washed with water (2 x 200 ml.) and dried. The solvent was removed and the residual oil was dissolved in benzene and filtered over 200 g. of Grade 1 activated neutral alumina. Removal of solvent gave an oil which was dissolved in 300 ml. of ether. After removal of a precipitate which appeared, the ether mother liquors were concentrated to an oil which was dissolved in 300 ml. of hexane. After standing for a period of several weeks, 7-chloro-1-(4-chlorobutyl) - 5 - (2 - fluorophenyl)-1,3-dihydro-2H-1,4-benzodiazepin-2-one crystallized. The product was recrystallized from an ether-hexane mixture as pale yellow prisms, M.P. 90–93°.

*Example 42*

A mixture of 30 g. of 7-chloro-1-(4-chlorobutyl)-5-(2-fluorophenyl) - 1,3 - dihydro-2H-1,4-benzodiazepin-2-one, 23.3 g. of diethylamine and 12.0 g. of sodium iodide in 100 ml. of N,N-dimethylformamide was heated and stirred at 50° for 48 hours. Solvents were removed under reduced pressure and the residue dissolved in 200 ml. of dichloromethane. The dichloromethane solution was washed with water and then extracted with 3 N hydrochloric acid (3 x 100 ml.). The acid extracts were combined, washed with ether (2 x 50 ml.), made basic with ammonium hydroxide and extracted with dichloromethane (3 x 75 ml.). The dichloromethane layers were combined, washed, dried and evaporated to give 7-chloro-1-(4 - diethylaminobutyl) - 5-(2-fluorophenyl)-1,3-dihydro-2H-1,4-benzodiazepin-2-one as an oil.

7 - chloro-1-(4-diethylaminobutyl)-5-(2-fluorophenyl)-1,3-dihydro-2H-1,4-benzodiazepin - 2 - one hydrochloride hemihydrate was prepared as in Example 38. The product was recrystallized in the presence of a trace of water from an acetone-ether mixture as pale yellow prisms, M.P. 138–140° dec.

*Example 43*

A solution of sodium methoxide in methanol (101.5 ml. of a solution containing .00407 m./ml.; 0.410 m. NaOCH₃) was added to a stirred solution of 7-chloro-5 - (2-fluorophenyl)-1,3-dihydro-2H-1,4-benzodiazepin-2-one (100 g., 0.346 m.) in N,N-dimethylformamide (200 ml.). The mixture was stirred for 30 minutes at 10° and a solution composed of γ-dimethylaminopropyl chloride (105 g., 0.865 m.) in toluene (200 ml.) was added over a period of 10 minutes.

The reaction mixture was stirred and heated to 70° and maintained at 70–75° for 3.5 hours. Solvents were removed under reduced pressure and the residue partitioned between ether (400 ml.) and water (400 ml.). The layers were separated and the aqueous layer was extracted with ether (200 ml.). The combined ether layers were added to 400 ml. of water followed by sufficient 3 N hydrochloric acid to bring the pH to 5 after shaking. The layers were separated and the aqueous layer was washed with ether (2 x 100 ml.). The combined ether layers were washed with dilute ammonia and water, dried over sodium sulfate, filtered and concentrated.

The acidic aqueous layer was made basic with 20 percent sodium carbonate solution and extracted with ether (2 x 200 ml.). The combined ether layers were washed with water and saturated brine solution and dried over anhydrous sodium sulfate, filtered and concentrated yielding 7 - chloro - 1 - (3-dimethylaminopropyl)-5-(2-fluorophenyl)-1,3-dihydro-2H-1,4-benzodiazepin-2-one as an oil. The residual oil was dissolved in 150 ml. of ethanol and hydrogen chloride was bubbled into the solution for approximately 15 minutes. 7-chloro-1-(3-dimethylaminopropyl) - 5-(2-fluorophenyl)-1,3-dihydro-2H-1,4-benzodiazepin-2-one dihydrochloride was crystallized by adding 500 ml. of ether to the ethanol solution and cooling for 1 hour. The product was filtered and recrystallized by dissolving the salt in methanol (100 ml.), adding ether (500 ml.) and cooling the mixture. Three recrystallizations gave the product as pale yellow prisms melting with decomposition at 200–213° (sealed tube).

*Example 44*

A solution of 5 g. of 7-chloro-1-(3-dimethylaminopropyl) - 5 - (2-fluorophenyl)-1,3-dihydro-2H-1,4-benzodiazepin-2-one in 100 ml. of 50 percent aqueous acetic acid was hydrogenated at room temperature and at atmospheric pressure until one molar equivalent of hydrogen was absorbed in the presence of 0.3 g. of platinum oxide. The catalyst was removed by filtration over diatomaceous earth ("Celite"), and the reaction mixture was made basic with sodium carbonate solution (20 percent w./w.). The product was extracted into dichloromethane (3 x 50 ml.). The organic layers were combined, washed, dried and evaporated to give 7-chloro-1-(3-dimethylaminopropyl) - 5 - (2-fluorophenyl)-1,3,4,5-tetrahydro-2H-1,4-benzodiazepin-2-one. The dihydrochloride was formed as in Example 38 and recrystallized from a methanolether mixture as white prisms, M.P. 186–200° dec.

*Example 45*

A solution of 5.0 g. of 7-chloro-5-(2-fluorophenyl)-1,3-dihydro - 1 - (3-methylaminopropyl)-2H-1,4-benzodiazepin-2-one dihydrochloride in 100 ml. of 50 percent aqueous acetic acid was hydrogenated in the presence of 0.5 g. of platinum oxide at room temperature and atmospheric pressure until one molar equivalent of hydrogen was absorbed. The catalyst was removed by filtration over diatomaceous earth and the reaction mixture was made basic with sodium carbonate solution (20 percent w./w.). The mixture was extracted with dichloromethane (3 x 50 ml.). The organic layers were combined, washed, dried and evaporated to give 7 - chloro - 5 - (2 - fluorophenyl) - 1,3,4,5 - tetrahydro - 1 - (3-methylaminopropyl)-2H-1,4-benzodiazepin-2-one as an oil.

7 - chloro - 5-(2-fluorophenyl)-1,3,4,5-tetrahydro-1-(3-methylaminopropyl) - 2H - 1,4 - benzodiazepin-2-one dihydrochloride hydrate was prepared as in Example 38. The product was recrystallized in the presence of a trace of water from a methanol-ether mixture as white needles having a melting point of 230–235° dec. (sealed tube).

*Example 46*

A solution of 5.0 g. of 7-chloro-5-(2-fluorophenyl)-1,3-dihydro - 1 - (3 - diethylaminopropyl)-2H-1,4-benzodiazepin-2-one dihydrochloride in 180 ml. of 50 percent aqueous acetic acid was hydrogenated in the presence of 1.0 g. of platinum oxide at room temperature and atmospheric pressure until one molar equivalent of hydrogen was absorbed. The catalyst was removed by filtration over diatomaceous earth and the reaction mixture was made basic with sodium carbonate solution (20 percent w./w.). The product was extracted with dichloromethane (3 x 50 ml.). The organic layers were combined, washed, dried and evaporated to give 7 - chloro - 5 - (2-fluorophenyl)-1,3,4,5 - tetrahydro - 1 - (3-diethylaminopropyl)-2H-1,4-benzodiazepin-2-one as an oil.

7 - chloro - 5 - (2-fluorophenyl)-1,3,4,5-tetrahydro-1-(3 - diethylaminopropyl) - 2H - 1,4-benzodiazepin-2-one dihydrochloride was prepared as in Example 38. The product was recrystallized from a methanol-ether mixture as white prisms having a melting point of 237–242° dec.

*Example 47*

A solution of 5 g. of 7-chloro-5-(2-fluorophenyl)-1,3-dihydro - 1 - (4 - diethylaminobutyl)-2H-1,4-benzodiazepin-2-one in 90 ml. of 50 percent aqueous acetic acid was hydrogenated in the presence of 0.5 g. of platinum oxide at room temperature and atmospheric pressure until one molar equivalent of hydrogen was absorbed. The catalyst was removed by filtration over diatomaceous earth and the reaction mixture was made basic with sodium carbonate solution (20 percent w./w.. The product was extracted with dichloromethane (3 x 50 ml.). The organic layers were combined, washed, dried and evaporated to give 7 - chloro - 5 - (2-fluorophenyl)-1,3,4,5-tetrahydro-1 - (4 - diethylaminobutyl) - 2H - 1,4-benzodiazepin-2-one as an oil.

7 - chloro - 5 - (2-fluorophenyl)-1,3,4,5-tetrahydro-1-(4 - diethylaminobutyl) - 2H - 1,4-benzodiazepin-2-one dihydrochloride was prepared as in Example 38. The product was recrystallized from a methanol-ether mixture as white rods having a melting point of 230–238° dec.

Example 48

A solution of 22 g. of 7-bromo-1,3-dihydro-5-(2-pyridyl) - 2H - 1,4 - benzodiazepin-2-one in 55 ml. of N,N-dimethylformamide was treated with 11 ml. of a methanolic solution of sodium methoxide (0.0835 mole of NaOCH₃) and stirred for 0.5 hours. 15 ml. of a toluene solution containing 0.0174 mole of γ-dimethylaminopropyl chloride was thereafter added, and the mixture stirred at 75° C. for 5.5 hours. Solvents were removed under reduced pressure and the residual oil was dissolved in 100 ml. of dichloromethane. The resultant solution was washed with water, dried and evaporated. The oil was next dissolved in 100 ml. of ethyl acetate and filtered over 100 g. of activated neutral alumina (Grade I). Using ethyl acetate as the eluent, 7-bromo-1,3-dihydro-1-(3 - dimethylaminopropyl) - 5 - (2-pyridyl)-2H-1,4-benzodiazepin-2-one was recovered from the column.

The dihydrobromide was formed as in Example 38 employing HBr. The product was recrystallized from a methanol-ether mixture as white prisms, M.P. 130–146° dec.

Formation of the dihydrochloride was also effected as in Example 38. The salt was recrystallized from a methanol-ether mixture as pale yellow prisms, M.P. 181–183° dec.

Example 49

The sodio derivative of 10 g. of 7-bromo-1,3,-dihydro-5-(2-pyridyl)-2H-1,4-benzodiazepin-2-one in 25 ml. of N,N-dimethylformamide was prepared using 0.0380 mole of sodium methoxide in 5 ml. of methanol and then 75 ml. of a toluene solution of diethylaminoethyl chloride (0.0634 mole) was added to the reaction mixture. The mixture was heated at 60° for 2 hours and then evaporated under reduced pressure to an oil. The oil was dissolved in 200 ml. of ether, washed, dried and filtered over 50 g. of activated neutral alumina (Grade I). Elution with ether gave, after removal of solvents, 7 - bromo - 1 - (2 - diethylaminoethyl)-1,3-dihydro-5-(2 - pyridyl) - 2H-1,4-benzodiazepin-2-one. 7-bromo-1-(2-diethylaminoethyl)-1,3-dihydro-5-(2 - pyridyl) - 2H-1,4 - benzodiazepin - 2 - one hydrochloride was prepared as in Example 38. The product was recrystallized from a methanol-ether mixture as white prisms, M.P. 176–180° dec.

Example 50

A solution of 55 g. of 7 - bromo - 1 - (2-diethylaminoethyl) - 1,3 - dihydro - 5 - ( 2 - pyridyl) - 2H - 1,4-benzodiazepin-2-one hydrochloride in 80 ml. of 50 percent aqueous acetic acid was hydrogenated at room temperature and at atmos. pressure in the presence of 0.3 g. of platinum oxide until one molar equivalent of hydrogen was absorbed. The catalyst was removed by filtration over diatomaceous earth and the reaction mixture was made basic with sodium carbonate solution (20 percent w./w.). The product was extracted with dichloromethane. The organic layers were washed, dried and evaporated to give 7 - bromo - 1 - (2-diethylaminoethyl)-1,3,4,5 - tetrahydro-5-(2-pyridyl)-2H-1,4-benzodiazepin-2-one as an oil.

7-bromo-1-(2-diethylaminoethyl)-1,3,4,5 - tetrahydro-5-(2-pyridyl)-2H-1,4-benzodiazepin - 2 - one dihydrobromide was prepared as in example 38 utilizing hydrogen bromide. The product was recrystallized from a methanol-ether mixture and was found to have a melting point of 214–220° dec.

Example 51

To a solution of 2,3-dihydro-7-nitro-5-phenyl-1H-1,4-benzodiazepine (26.7 g., 0.100 moles) in anhydrous N,N-dimethylformamide (300 ml.) was added sodium methoxide (5.00 g., 0.110 moles) and the mixture was stirred at room temperature for 1 hour. A solution of 2-chloro-N,N-diethylethylamine was then added dropwise over 2 hours. The mixture was stirred and heated in a water-bath at 60° for 1 hour and was then concentrated in vacuo to a small volume, diluted with water and extracted with methylene chloride. The extract was washed with water, dried (Na₂SO₄), and evaporated to give a dark colored viscous oil. This was dissolved in benzene and chromatographed over a column of "Woelm" neutral alumina activity I. Evaporation of the benzene fraction gave 1,(2-diethylaminoethyl)-2,3 - dihydro - 7 - nitro-5-phenyl-1H-1,4-benzodiazepine as an oil. The oil was dissolved in the calculated quantity of methanolic 1.5 N-hydrogen chloride to form the dihydrochloride followed by addition of ether to precipitate 1-(2-diethylaminoethyl) - 2,3 - dihydro - 7 - nitro - 5 - phenyl-1H-1,4-benzodiazepine dihydrochloride as yellow plates, M.P. 232–236° C.

Example 52

1-(2-diethylaminoethyl)-2,3 - dihydro - 7 - nitro - 5-phenyl - 1H - 1,4 - benzodiazepine dihydrochloride (30 g.) was converted to the free base by dissolving it in water, making the solution basic with 3 N sodium hydroxide solution and extraction with methylene chloride. The extract was washed with water, dried (MgSO₄) and evaporated to give the free base as a yellow viscous oil. This was dissolved in methanol (800 ml.) and hydrogenated over Raney nickel (3 teaspoonfuls). Uptake of hydrogen stopped after the absorption of 3 molar proportions of hydrogen (in 3 hours). The catalyst was filtered off on a bed of "Hyflo," washed with methanol and discarded. Evaporation of the filtrates in vacuo gave 7 - amino - 1 - (2 - diethylaminoethyl) - 2,3 - dihydro-5-phenyl-1H-1,4-benzodiazepine as an oil.

The product was purified by dissolving it in methylene chloride and thereafter passing the resultant solution through a bed of "Woelm" neutral alumina activity III. The eluate was evaporated and added with stirring to 3 N hydrochloric acid (72 ml., 6 equivalents). The resultant solution was cooled at —10° C., and treated dropwise with a solution of sodium nitrite (2.76 g.) in water (8 ml.) until the potassium iodide starch reaction remained positive. The resulting solution was added dropwise over 35 minutes to a stirred solution of cuprous chloride (7.00 g.) in a mixture of concentrated hydrochloric acid (40 ml.) and water (20 ml.). The mixture was heated in a water-bath at 35–40° (3 hours) and finally at 60° (10 minutes) until evolution of nitrogen ceased. The reaction mixture was then diluted with water, made basic with 3 N aqueous ammonia and extracted with methylene chloride. The extract was washed with water, dried (Na₂SO₄) and evaporated to give 7-chloro - 1 - (2 - diethylaminoethyl) - 2,3 - dihydro - 5-phenyl-1H-1,4-benzodiazepine. This was converted to the dihydrochloride as described in Example 51 giving 7 - chloro - 1 - (2 - diethylaminoethyl) - 2,3-dihydro-5-phenyl-1H-1,4-benzodiazepine dihydrochloride as orange prisms, M.P. 234–236° C.

We claim:
1. A compound selected from the group consisting of compounds of the formula

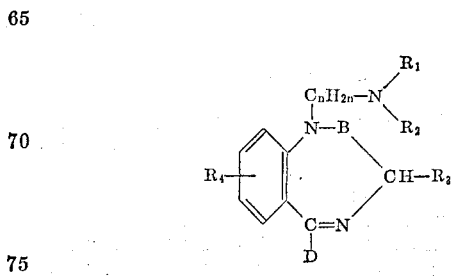

compounds of the formula

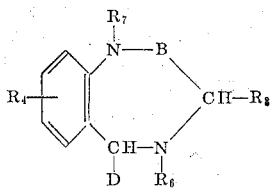

and pharmaceutically acceptable acid addition salts thereof, wherein D is selected from the group consisting of

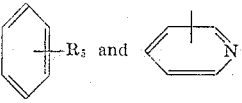

B is selected from the group consisting of methylene and carbonyl; n is a whole integer from 2 to 7; $R_1$ and $R_2$ are selected from the group consisting of individually hydrogen and lower alkyl and, taken together with the nitrogen atom, N-lower alkyl-piperazinyl, N-hydroxy-lower alkyl-piperazinyl, N-lower alkoxy-lower alkyl-piperazinyl, N-lower alkenyloxy-lower alkyl-piperazinyl, pyrrolidinyl, piperazinyl, morpholinyl and piperidinyl; at least one of $R_1$ and $R_2$ being other than hydrogen; $R_3$ is selected from the group consisting of hydrogen, lower alkyl, hydroxy and lower alkanoyloxy; $R_4$ is selected from the group consisting of hydrogen, halogen, trifluoromethyl, lower alkyl-mercapto, cyano, lower alkyl and nitro; $R_5$ is selected from the group consisting of hydrogen, halogen, lower alkyl, trifluoromethyl and nitro; $R_6$ and $R_7$ are each selected from the group consisting of hydrogen, lower alkyl, lower alkenyl, lower alkynyl and

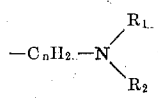

and at least one of $R_6$ and $R_7$ is

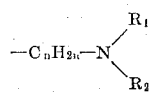

2. A compound selected from the group consisting of compounds of the formula

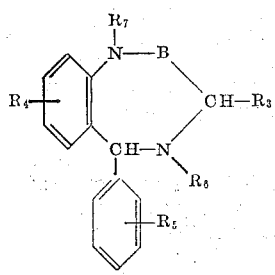

and pharmaceutically acceptable acid addition salts thereof
wherein B is selected from the group consisting of carbonyl and methylene; $R_3$ is selected from the group consisting of hydrogen, lower alkyl, hydroxy and lower alkanoyloxy; $R_4$ is selected from the group consisting of hydrogen, halogen, trifluoromethyl, lower alkylmercapto, cyano, lower alkyl and nitro; $R_5$ is selected from the group consisting of hydrogen, halogen, lower alkyl, trifluoromethyl and nitro and $R_6$ and $R_7$ are selected from the group consisting of hydrogen, lower alkyl, lower alkenyl, lower alkynyl and

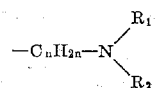

and at least one of $R_6$ and $R_7$ is $$-C_nH_{2n}-N\begin{matrix}R_1\\R_2\end{matrix}$$

and wherein $n$ is a whole integer from 2 to 7 and $R_1$ and $R_2$ are selected from the group consisting of, individually, hydrogen and lower alkyl and, taken together with the nitrogen atom, N-lower alkyl-piperazinyl, N-hydroxy-lower alkyl-piperazinyl, N-lower alkoxy-lower alkyl-piperazinyl, N-lower alkenyloxy-lower alkyl-piperazinyl, pyrrolidinyl, piperazinyl, morpholinyl and piperidinyl; at least one of $R_1$ and $R_2$ being other than hydrogen.

3. A compound of the formula

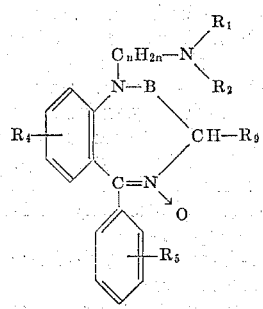

wherein B is selected from the group consisting of methylene and carbonyl and $n$ is a whole integer from 2 to 7; $R_1$ and $R_2$ are selected from the group consisting of individually hydrogen and lower alkyl and, taken together with the nitrogen atom, N-lower alkyl-piperazinyl, N-hydroxy-lower alkyl-piperazinyl, N-lower alkoxy-lower alkyl-piperazinyl, N-lower alkenyloxy-lower alkyl-piperazinyl, pyrrolidinyl, piperazinyl, morpholinyl and piperidinyl; at least one of $R_1$ and $R_2$ being other than hydrogen; $R_9$ is selected from the group consisting of hydrogen and lower alkyl; $R_4$ is selected from the group consisting of hydrogen, halogen, trifluoromethyl, lower alkyl-mercapto, lower alkyl, cyano and nitro; and $R_5$ is selected from the group consisting of hydrogen, halogen, lower alkyl, trifluoromethyl and nitro.

4. A compound selected from the group consisting of compounds of the formula

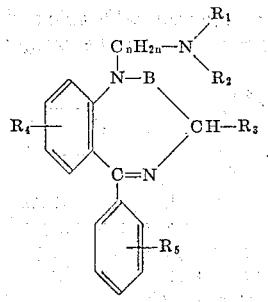

and pharmaceutically acceptable acid addition salts thereof,
wherein $n$ is a whole integer from 2 to 7; B is selected from the group consisting of methylene and carbonyl; $R_1$ and $R_2$ are selected from the group consisting of individually hydrogen and lower alkyl and, taken together with the nitrogen atom, N-lower alkyl-piperazinyl, N-hydroxy-lower alkyl-piperazinyl, N-lower alkoxy-lower alkyl-piperazinyl, N-lower alkenyloxy-lower alkyl-piperazinyl, pyrrolidinyl, piperazinyl, morpholinyl and piperidinyl; at least one of $R_1$ and $R_2$ being other than hydrogen; $R_3$ is selected from the group consisting of hydrogen, lower alkyl, hydroxy and lower alkanoyloxy; $R_4$ is selected from the group consisting of hydrogen, halogen, trifluoromethyl, lower alkyl-mercapto, cyano, lower alkyl and nitro; and $R_5$ is selected from the group consisting of hydrogen, halogen, lower alkyl, trifluoromethyl and nitro.

5. 7-halo-1-(di-lower alkylamino-lower alkyl)-5-phenyl-3H-1,4-benzodiazepin-2(1H)-one.

6. 7-chloro-1-(2-diethylaminoethyl)-5-phenyl-3H-1,4-benzodiazepin-2(1H)-one.

7. 7-chloro-1-(2-dimethylaminoethyl)-5-phenyl-3H-1,4-benzodiazepin-2(1H)-one.

8. 7-nitro-1-(2-dimethylaminoethyl)-5-phenyl-3H-1,4-benzodiazepin-2(1H)-one.

9. 7-trifluoromethyl-1-(2-dimethylaminoethyl)-5-phenyl-3H-1,4-benzodiazepin-2(1H)-one.

10. 7-halo-1-(di-lower alkylamino-lower alkyl)-5-(2-halophenyl)-3H-1,4-benzodiazepin-2(1H)-one.

11. 7-chloro-1-(2-diethylaminoethyl)-5-(2-fluorophenyl)-3H-1,4-benzodiazepine-2(1H)-one.

12. 7-chloro-1-(2-diethylaminoethyl)-4,5-dihydro-5-(2-fluorophenyl)-3H-1,4-benzodiazepin-2(1H)-one.

13. 7-chloro-1-(3-dimethylaminopropyl)-5-(2-fluorophenyl)-1,3-dihydro-2H-1,4-benzodiazepin-2-one.

14. 7-chloro-1-(3-dimethylaminopropyl)-5-(2-fluorophenyl)-1,3,4,5-tetrahydro-2H-1,4-benzodiazepin-2-one.

15. 7-chloro-1-(halo-lower alkyl)-1,3-dihydro-5-phenyl-2H-1,4-benzodiazepin-2-one.

16. 7-chloro-1-(3-chloropropyl)-1,3-dihydro-5-phenyl-2H-1,4-benzodiazepin-2-one.

17. A compound selected from the group consisting of compounds of the formula (I)
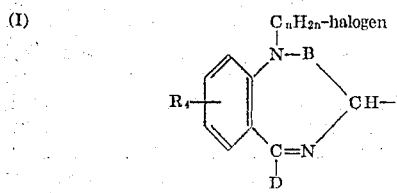

compounds of the formula (II)
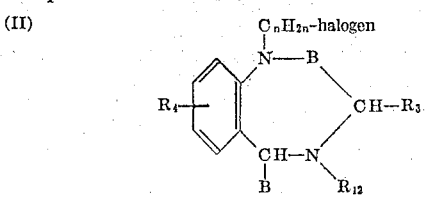

and pharmaceutically acceptable acid addition salts thereof wherein D is selected from the group consisting of

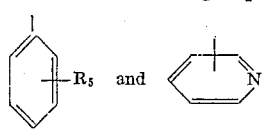

B is selected from the group consisting of methylene and carbonyl; $n$ is a whole integer from 2 to 7; $R_3$ is selected from the group consisting of hydrogen, lower alkyl, hydroxy and lower alkanoyl; $R_4$ is selected from the group consisting of hydrogen, halogen, trifluoromethyl, lower alkyl-mercapto, lower alkyl, cyano and nitro; $R_5$ is selected from the group consisting of hydrogen, halogen, trifluoromethyl, lower alkyl and nitro; $R_{12}$ is selected from the group consisting of hydrogen, lower alkyl, lower alkenyl, lower alkynyl,

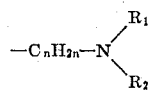

and $—C_nH_{2n}—$ halogen wherein $n$ is a whole integer from 2 to 7 and $R_1$ and $R_2$ are selected from the group consisting of individually hydrogen and lower alkyl and, taken together with the nitrogen atom, N-lower alkyl-piperazinyl, N-hydroxy-lower alkyl-piperazinyl, N-lower alkoxy-lower alkyl-piperazinyl, N-lower alkenyloxy-lower alkyl-piperazinyl, pyrrolidinyl, piperazinyl, morpholinyl and piperidinyl, at least one of $R_1$ and $R_2$ being other than hydrogen.

18. A compound selected from the group consisting of compounds of the formula

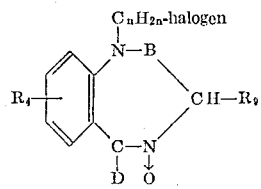

and pharmaceutically acceptable salts thereof wherein D is selected from the group consisting of

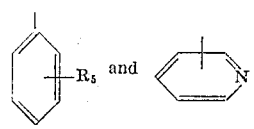

B is selected from the group consisting of carbonyl and methylene; $n$ is a whole integer from 2 to 7; $R_4$ is selected from the group consisting of hydrogen, halogen, trifluoromethyl, lower alkyl-mercapto, lower alkyl, cyano and nitro; $R_5$ is selected from the group consisting of halogen, hydrogen, trifluoromethyl, lower alkyl and nitro; and $R_9$ is selected from the group consisting of hydrogen and lower alkyl.

19. A compound selected from the group consisting of compounds of the formula

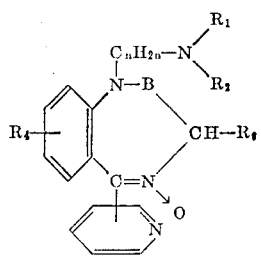

and pharmaceutically acceptable acid addition salts thereof

B is selected from the group consisting of carbonyl and methylene; $n$ is a whole integer from 2 to 7; $R_1$ and $R_2$ are selected from the group consisting of, individually, hydrogen and lower alkyl and, taken together with the nitrogen atom, N-lower alkyl-piperazinyl, N-hydroxy-lower alkyl-piperazinyl, N-lower alkoxy-lower alkyl-piperazinyl, N-lower alkenyloxy-lower alkyl-piperazinyl, pyrrolidinyl, piperazinyl, morpholinyl and piperidinyl; at least one of $R_1$ and $R_2$ being other than hydrogen; $R_9$ is selected from the group consisting of hydrogen and lower alkyl $R_4$ is selected from the group consisting of hydrogen, halogen, trifluoromethyl, lower alkylmercapto, nitro, lower alkyl and cyano.

20. A compound selected from the group consisting of compounds of the formula

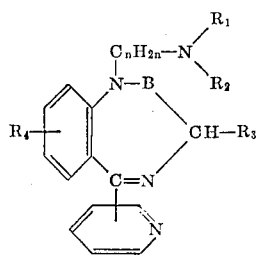

and pharmaceutically acceptable acid addition salts thereof

B is selected from the group consisting of carbonyl and methylene; $n$ is a whole integer from 2 to 7; $R_1$ and $R_2$ are selected from the group consisting of, individually, hydrogen and lower alkyl and, taken together with the nitrogen atom, N-lower alkyl-piperazinyl, N-hydroxy-lower alkyl-piperazinyl, N-lower alkoxy-lower alkyl-piperazinyl, N-lower alkenyloxy-lower alkyl-piperazinyl, pyrrolidinyl, piperazinyl, morpholinyl and piperidinyl; at least one of $R_1$ and $R_2$ being other than hydrogen; $R_3$ is selected from the group consisting of hydrogen, lower alkyl, hydroxy and lower alkanoyl and, $R_4$ is selected from the group consisting of hydrogen, halogen, trifluoromethyl, lower alkylmercapto, nitro, lower alkyl and cyano.

21. A compound selected from the group consisting of compounds of the formula

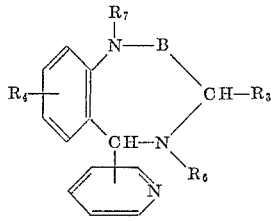

and pharmaceutically acceptable acid solution salts thereof
wherein B is selected from the group consisting of carbonyl and methylene; $R_3$ is selected from the group consisting of hydrogen, lower alkyl, hydroxy and lower alkanoyl; $R_4$ is selected from the group consisting of hydrogen, halogen, trifluoromethyl, lower alkylmercapto, nitro, lower alkyl and cyano and $R_6$ and $R_7$ are selected from the group consisting of hydrogen, lower alkyl, lower alkenyl, lower alkynyl and

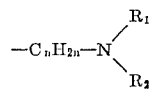

and at least one of $R_6$ and $R_7$ is

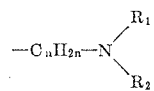

wherein n is a whole integer from 2 to 7 and $R_1$ and $R_2$ are selected from the group consisting of, individually, hydrogen and lower alkyl and, taken together with the nitrogen atom, N-lower alkyl-piperazinyl, N-hydroxy-lower alkyl-piperazinyl, N-lower alkoxy-lower alkyl-piperazinyl, N-lower alkenyloxy-lower alkyl-piperazinyl, pyrrolidinyl, piperazinyl, morpholinyl and piperidinyl; at least one of $R_1$ and $R_2$ being other than hydrogen.

22. 7-halo-1 - (di - lower alkylamino - lower alkyl) - 5-(2-pyridyl)-2H-1,4-benzodiazepin-2-one.

23. 7-bromo-1,3-dihydro-1-(3 - dimethylaminopropyl)-5-(2-pyridyl)-2H-1,4-benzodiazepin-2-one.

24. 7-bromo-1-(2-diethylaminoethyl)-1,3 - dihydro - 5-(2-pyridyl)-2H-1,4-benzodiazepin-2-one.

25. 7-halo-1-(di-lower alkylamino-lower alkyl)-1,3,4,5-tetrahydro-5-(2-pyridyl)-2H-1,4-benzodiazepin-2-one.

26. 7-bromo-1-(2-diethylaminoethyl)-1,3,4,5 - tetrahydro-5-(2-pyridyl)-2H-1,4-benzodiazepin-2-one.

References Cited by the Examiner

UNITED STATES PATENTS

| | | | |
|---|---|---|---|
| 2,461,038 | 2/1945 | Cusic | 260—570 |
| 2,532,292 | 12/1950 | Cusic | 260—570 |
| 2,576,106 | 11/1951 | Cusic | 260—561 |
| 2,687,414 | 8/1954 | Cusic | 260—243 |
| 3,109,843 | 11/1963 | Reeder et al. | 260—239 |
| 3,121,076 | 2/1964 | Keller et al. | 260—239.3 |

WALTER A. MODANCE, *Primary Examiner.*

ROBERT T. BOND, *Assistant Examiner.*